(12) United States Patent
Chen et al.

(10) Patent No.: US 11,025,918 B2
(45) Date of Patent: Jun. 1, 2021

(54) FOVEATED VIDEO LINK FOR VR, LOW LATENCY WIRELESS HMD VIDEO STREAMING WITH GAZE TRACKING

(71) Applicant: Sony Interactive Entertainment Inc., Tokyo (JP)

(72) Inventors: Eric Hsuming Chen, Saratoga, CA (US); Hung-Ju Lee, Pleasanton, CA (US); Jason N. Wang, Palo Alto, CA (US); Rathish Krishnan, Los Gatos, CA (US); Deepali Arya, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/840,893

(22) Filed: Dec. 13, 2017

(65) Prior Publication Data

US 2018/0192058 A1   Jul. 5, 2018

Related U.S. Application Data

(60) Provisional application No. 62/440,198, filed on Dec. 29, 2016.

(51) Int. Cl.
*H04N 19/167* (2014.01)
*H04N 19/119* (2014.01)
(Continued)

(52) U.S. Cl.
CPC ........... *H04N 19/167* (2014.11); *G06T 3/403* (2013.01); *G06T 7/11* (2017.01); *G06T 7/73* (2017.01);
(Continued)

(58) Field of Classification Search
CPC ...... H04N 19/167; H04N 19/59; H04N 19/17; H04N 19/132; H04N 19/119;
(Continued)

(56) References Cited

U.S. PATENT DOCUMENTS 6,252,989 B1 * 6/2001 Geisler ............... H04N 19/176
345/555
6,623,428 B2   9/2003 Miller et al.
(Continued)

FOREIGN PATENT DOCUMENTS

EP    1304866 A3    7/2004
GB    2404105 A *   1/2005 ............... G06T 9/00
(Continued)

OTHER PUBLICATIONS

Jafari et al. "Fast Intra- and Inter-Prediction Mode Decision of H.264/AVC for Medical Frame Compression based on Region of Interest," Australian Journal of Basic and Applied Sciences, 5(5): 397-411,2011, ISSN: 1991-8178 (Year: 2011).*
(Continued)

*Primary Examiner* — Sath V Perungavoor
*Assistant Examiner* — Tyler B Edwards
(74) *Attorney, Agent, or Firm* — JDI Patent; Joshua D. Isenberg; Robert Pullman

(57) ABSTRACT

Gaze tracking data is analyzed to determine one or more regions of interest within an image of a video stream. The video stream data is selectively scaled so that sections within the regions of interest maintain high resolution while areas not within the region of interest are down-scaled to reduce bandwidth cost of transmission. A scheme for reduction of motion sickness by reducing the size of the high resolution area is also claimed.

40 Claims, 12 Drawing Sheets

(51) Int. Cl.

| | | |
|---|---|---|
| *H04N 19/172* | (2014.01) | |
| *G06T 3/40* | (2006.01) | |
| *G06T 7/11* | (2017.01) | |
| *G06T 11/60* | (2006.01) | |
| *G06T 7/73* | (2017.01) | |
| *H04N 19/59* | (2014.01) | |
| *H04N 19/17* | (2014.01) | |
| *H04N 19/132* | (2014.01) | |

(52) U.S. Cl.
CPC ............ *G06T 11/60* (2013.01); *H04N 19/119* (2014.11); *H04N 19/132* (2014.11); *H04N 19/17* (2014.11); *H04N 19/172* (2014.11); *H04N 19/59* (2014.11); *G06T 2207/30201* (2013.01)

(58) Field of Classification Search
CPC ........... H04N 19/172; G06T 7/73; G06T 7/11; G06T 3/403; G06T 11/60; G06T 2207/30201
See application file for complete search history.

(56) References Cited

U.S. PATENT DOCUMENTS

| 7,277,484 | B2 | 10/2007 | Kim et al. | |
|---|---|---|---|---|
| 9,094,681 | B1* | 7/2015 | Wilkins | H04N 19/124 |
| 2003/0189579 | A1* | 10/2003 | Pope | G06T 3/403 |
| | | | | 345/660 |
| 2006/0093033 | A1 | 5/2006 | Kim et al. | |
| 2011/0141365 | A1 | 6/2011 | Park et al. | |
| 2012/0212631 | A1* | 8/2012 | Klirenko | A61B 5/7232 |
| | | | | 348/207.1 |
| 2014/0125694 | A1* | 5/2014 | Kaplan | G02B 27/01 |
| | | | | 345/629 |
| 2014/0270553 | A1 | 9/2014 | Zund et al. | |
| 2015/0312575 | A1* | 10/2015 | Bryant | H04N 19/182 |
| | | | | 375/240.08 |
| 2015/0365687 | A1* | 12/2015 | Le Floch | H04N 19/17 |
| | | | | 375/240.24 |
| 2016/0209648 | A1 | 7/2016 | Haddick et al. | |

FOREIGN PATENT DOCUMENTS

| GB | 2404105 A | 1/2005 | |
|---|---|---|---|
| JP | 2003284071 A | 10/2003 | |
| JP | 2014060512 A | 4/2014 | |
| WO | 2010137104 A1 | 12/2010 | |
| WO | WO-2010137104 A1 * | 12/2010 | ............... G06T 7/20 |

OTHER PUBLICATIONS

B. Patrão, S. Pedro, P. Menezes, How to Deal with Motion Sickness in Virtual Reality, Sciences and Technologies of Interaction (SciTecIN'15), EPCGI'2015: The 22nd Portuguese Conf. on Computer Graphics and Interaction, Coimbra, Portugal, 2015.

International Search Report & Written Opinion dated Apr. 5, 2018 for International Patent Application No. PCT/US2017/066205.

Kienzle W., Schölkopf B., Wichmann F.A., Franz M.O. (2007) How to Find Interesting Locations in Video: A Spatiotemporal Interest Point Detector Learned from Human Eye Movements. In: Hamprecht F.A., Schnörr C., Jähne B. (eds) Pattern Recognition. DAGM 2007. Lecture Notes in Computer Science, vol. 4713. Springer, Berlin, Heidelberg.

Partial European Supplementary Search Report dated Apr. 20, 2020 for European Patent Application No. 17888317.9.

Extended European Search Report dated Aug. 26, 2020 for European Patent Application No. 17888317.9.

Final Notification of Reasons for Refusal dated Nov. 24, 2020 for Japanese Patent Application No. 2019-535812.

Jihoon Ryoo et al., Design and Evaluation of a Foveated Video Streaming Service for Commodity Client Devices, MMSys'16, ACM, May 2016, pp. 1-11.

Non-Final Notification of Reasons for Refusal dated Jun. 16, 2020 for Japanese Patent Application No. 2019-535812.

* cited by examiner

FOVEATED VIDEO LINK FOR VR, LOW LATENCY WIRELESS HMD VIDEO STREAMING WITH GAZE TRACKING

CLAIM OF PRIORITY

This application claims the priority benefit of U.S. Provisional Patent Application No. 62/440,198 filed Dec. 29, 2016, the entire contents of which are incorporated herein by reference.

FIELD OF THE INVENTION

Aspects of the present disclosure are related to video compression. In particular the present disclosure relates to differential coding qualities within a video image.

BACKGROUND OF THE INVENTION

Graphical display devices having a wide field of view (FOV) have been developed. Such devices include head mounted display (HMD) devices. In an HMD device, a small display device is worn on a user's head. The display device has a display optic in front of one eye (monocular HMD) or each eye (binocular HMD). An HMD device typically includes sensors that can sense the orientation of the device and change the scene shown by the display optics as the user's head moves. Conventionally, most video displayed on wide FOV displays are compressed using a single compression algorithm where all parts of the screen have the same resolution.

However, displaying video for virtual reality (VR) programs, which is often performed in conjunction with HMD devices, requires a higher frame rate than conventional flat screen displays to prevent a user from experiencing motion sickness. Displaying video in very high resolution and high frame rate is very costly in terms of bandwidth. HMD for VR has optical systems to show video in wide FOV for immersive experiences. While the screen area around a primary gaze point (sometimes called the foveal region) requires high resolution, the areas outside the primary gaze point are observed only by the peripheral vision and can therefore be displayed at a lower resolution. Such video is sometimes referred to as foveated video.

It is within this context that the present disclosure arises.

SUMMARY OF THE INVENTION

Figure 1A:
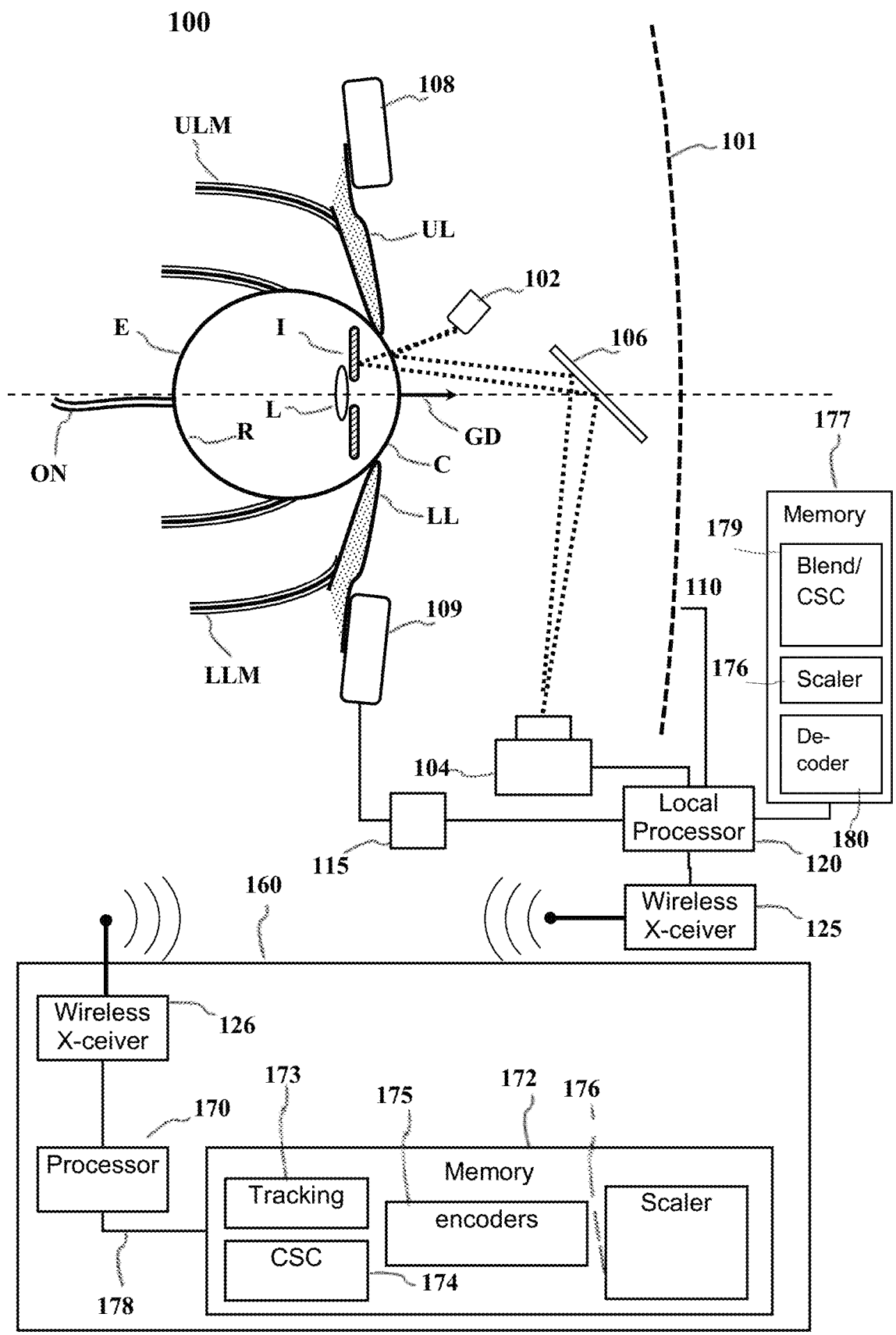
FIGS. 1A-1B are schematic diagrams illustrating gaze tracking within the context of aspects of the present disclosure.

The disadvantages associated with the prior art are overcome by aspects of the present disclosure relating to encoding and transmission of foveated video.

A method comprising: receiving a video image; obtaining gaze tracking information representing one or more regions of interest; compressing one or more subsections of the video image corresponding to the one or more regions of interest with a low compression encoder to generate low compression video data; downscaling the video image and compressing the video image with a high compression encoder to generate high compression video data; transmitting the high compression video data and the one or more low compression video data.

A method comprising: receiving high compression video data; receiving low compression video data corresponding to one or more low compression subsections of the video image representing one or more regions of interest obtained from gaze tracking information; decompressing the high compression video image; upscaling the decompressed video image; decompressing the one or more low compression subsections of the video image; combining the up-scaled video image with the one or more subsections of the video image in the regions of interest; and displaying the combined up-scaled video image and one or more subsections.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.

Introduction

Eye gaze tracking has been used in a wide range of applications, including medical research, automobile technology, computer entertainment and video game programs, control input devices, augmented reality glasses, and more. There are a number of techniques for eye tracking, also known as gaze tracking. Techniques for eye gaze tracking and selective rendering compression are described in co-pending application 2015/087,471, the contents of which are incorporated by reference herein. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect which occurs in images during conventional flash photography. In this method of gaze tracking, the bright reflection from pupil itself helps the system locate the pupil if contrast between pupil and iris is not enough.

Dark Pupil tracking involves illumination with a light source that is substantially off line from the optical axis of the camera, causing light directed through the pupil to be reflected away from the optical axis of the camera, resulting in an identifiable dark spot in the image at the location of the pupil. In alternative Dark Pupil tracking systems, an infrared light source and cameras directed at eyes can look at corneal reflections. Such camera based systems track the location of the pupil and corneal reflections which provides parallax due to different depths of reflections gives additional accuracy.

FIG. 1A depicts an example of a dark pupil gaze tracking system 100 that may be used in the context of the present disclosure. The gaze tracking system tracks the orientation of a user's eye E relative to a display screen 101 on which visible images are presented. While a display screen is used in the example system of FIG. 1A, certain alternative embodiments may utilize an image projection system capable of projecting images directly into the eyes of a user. In these embodiments, the user's eye E would be tracked relative to the images projected into the user's eyes. In the example of FIG. 1A, the eye E gathers light from the screen 101 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL,LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 102, e.g., light emitting diodes (LEDs) that direct non-visible light (e.g., infrared light) toward the eye E. Part of the non-visible light reflects from the cornea C of the eye and part reflects from the iris. The reflected non-visible light is directed toward a suitable sensor 104 (e.g., an infrared camera) by a wavelength-selective mirror 106. The mirror transmits visible light from the screen 101 but reflects the non-visible light reflected from the eye.

The sensor 104 is preferably an image sensor, e.g., a digital camera that can produce an image of the eye E which may be analyzed to determine a gaze direction GD from the relative position of the pupil. This image may be produced with a local processor 120 or via the transmission of the obtained gaze tracking data to a remote computing device 160. The local processor 120 may be configured according to well-known architectures, such as, e.g., single-core, dual-core, quad-core, multi-core, processor-coprocessor, cell processor, and the like. The image tracking data may be transmitted between the sensor 104 and the remote computing device 160 via a wired connection (not shown), or wirelessly between a wireless transceiver 125 included in the eye tracking device 110 and a second wireless transceiver 126 included in the remote computing device 160. The wireless transceivers may be configured to implement a local area network (LAN) or personal area network (PAN), via a suitable network protocol, e.g., Bluetooth, for a PAN.

The gaze tracking system 100 may also include an upper sensor 108 and lower sensor 109 that are configured to be placed, for example, respectively above and below the eye E. Sensors 108 and 109 may be independent components, or may alternatively be part of a component 110 worn on the user's head that may include, but is not limited to, any combination of the sensor 104, local processor 120, or inertial sensor 115 described below. In the example system shown in FIG. 1A, sensors 108 and 109 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 108 and lower sensor 109. The electrophysiological information collected by sensors 108 and 109 may include, for example, electroencephalography (EEG), electromyography (EMG), or evoked potential information collected as a result of nerve function in the area(s) surrounding the eye E. Sensors 108 and 109 may also be capable of collecting, for example, mechanomyogram or surface electromyogram information as a result of detecting the muscular vibrations or twitches of the muscles surrounding the eye E. The sensors 108 may also be capable of collecting information related to a motion sickness response, including for example, heart rate data, electrocardiography (ECG) or Galvanic skin response data. The data collected by sensors 108 and 109 may be delivered with the image tracking data to the local processor 120 and/or the remote computing device 160 as described above.

The gaze tracking system 100 may also be capable of tracking a user's head. Head tracking may be performed by an inertial sensor 115 capable producing signals in response to the position, motion, orientation or change in orientation of the user's head. This data may be sent to the local processor 120 and/or transmitted to the remote computing device 160. The inertial sensor 115 may be an independent component, or may alternatively be part of a component 110 worn on the user's head that may include, but is not limited to, any combination of the sensor 104, local processor 120, or sensors 108 and 109 described above. In alternative embodiments, head tracking may be performed via the tracking of light sources on the component 110. The gaze tracking system 100 may also include one or more memory units 177 (e.g., random access memory (RAM), dynamic random access memory (DRAM), Read only memory (ROM) and the like.

The local processor 120 may be configured to receive encoded data from the network connection 125. The local processor 120 may be operatively coupled to the one or more memory units 177 and configured to execute one or more programs stored on the memory units 177. The execution of such programs may cause the system to decode video streams from the remote computing device 160 and generate foveated video for display on the display 101. By way of example and not by way of limitation the programs may include a Blender/Conversion Space Configuration program 179, a Scaler program 176 and a decoder program. 180.

The remote computing device 160 may be configured to operate in coordination with the eye tracking device 110 and the display screen 101, in order to perform eye gaze tracking and determine lighting conditions in accordance with aspects of the present disclosure. The computing device 160 may include one or more processor units 170, which may be configured according to well-known architectures, such as, e.g., single-core, dual-core, quad-core, multi-core, processor-coprocessor, cell processor, and the like. The computing device 160 may also include one or more memory units 172 (e.g., random access memory (RAM), dynamic random access memory (DRAM), read-only memory (ROM), and the like).

The processor unit 170 may execute one or more programs, portions of which may be stored in the memory 172, and the processor 170 may be operatively coupled to the memory 172, e.g., by accessing the memory via a data bus 178. The programs may be configured to perform eye gaze tracking and determine lighting conditions for the system 100. By way of example, and not by way of limitation, the programs may include gaze tracking programs 173, the execution of which may cause the system 100 to track a user's gaze, e.g., as discussed above, Conversion space configuration programs (CSC) 174 that convert the video frame stream to a form that can be presented by a display device, Encoder programs 175, and video stream scaler programs 176 the execution of which encodes a stream of low resolution video frames and selected high resolution sections of the video frames to be sent to the display. The encoder programs 175 may use a viewer motion sickness response to adjust that size of the region of interest (ROI) to be presented on the display at high resolution to reduce the chance of motion sickness occurring in the viewer, e.g., by reducing the size of the ROI.

By way of example, and not by way of limitation, the gaze tracking programs 173 may include processor executable instructions which cause the system 100 to determine one or more gaze tracking parameters of the system 100 from eye tracking data gathered with the image sensor 104 and eye movement data gathered from the upper and lower sensors 108 and 109, respectively, while light is emitted from the lighting source 102. The gaze tracking programs 173 may also include instructions which analyze images gathered with the image sensor 104 in order to detect a presence of a change in lighting conditions.

Figure 1B:
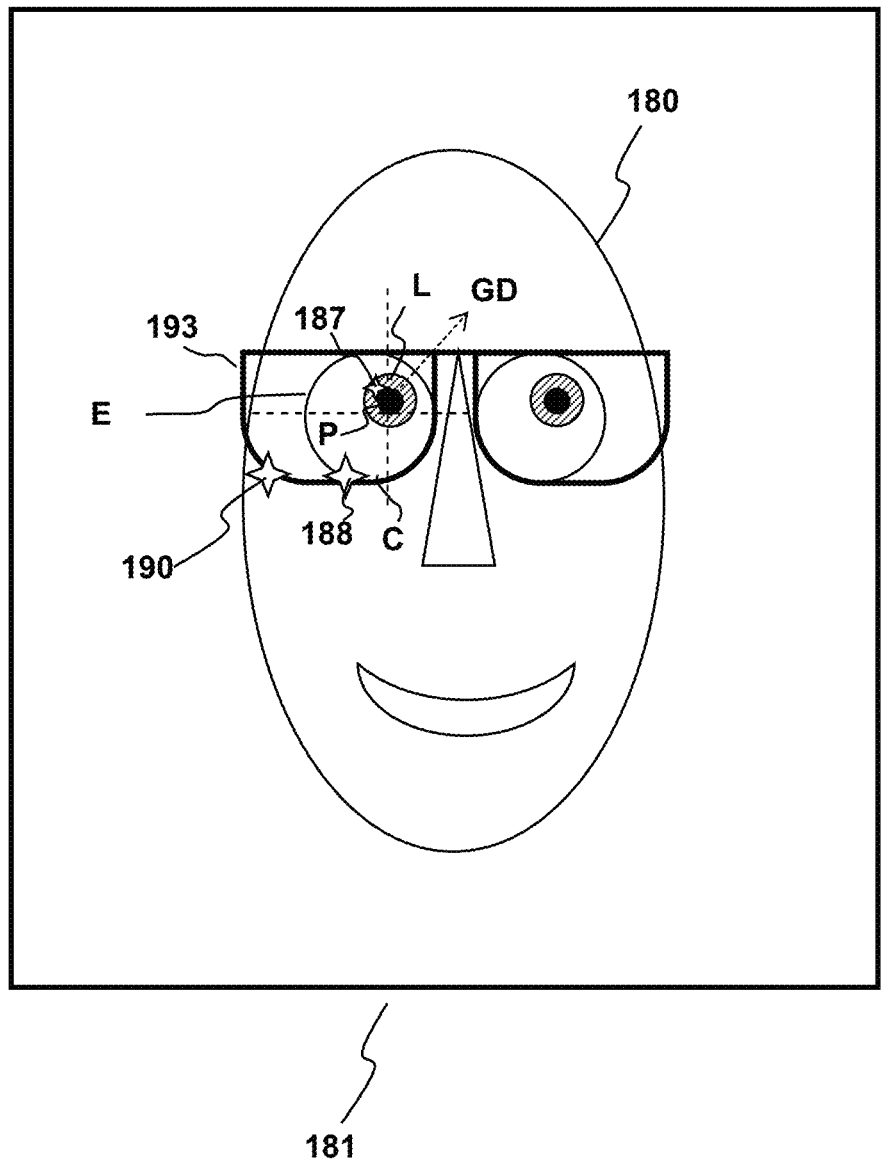

As seen in FIG. 1B, the image 181 showing a user's head H may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 101, by a straightforward geometric computation of a three-dimensional vector based on the known size and shape of the eyeball. The determined gaze direction GD is capable of showing the rotation and acceleration of the eye E as it moves relative to the screen 101.

As also seen in FIG. 1B, the image may also include reflections 187 and 188 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje Image and the lens reflection is the 4th Purkinje Image. There may also be reflections 190 from a user's eyeglasses 193, if these are worn a user.

Current HMD panels refresh at a constant rate of 90 or 120 Hertz (Hz) depending on the manufacturer. The high refresh rate increases power consumption of the panel and bandwidth requirements of the transmission medium to send frame updates.

Figure 3:
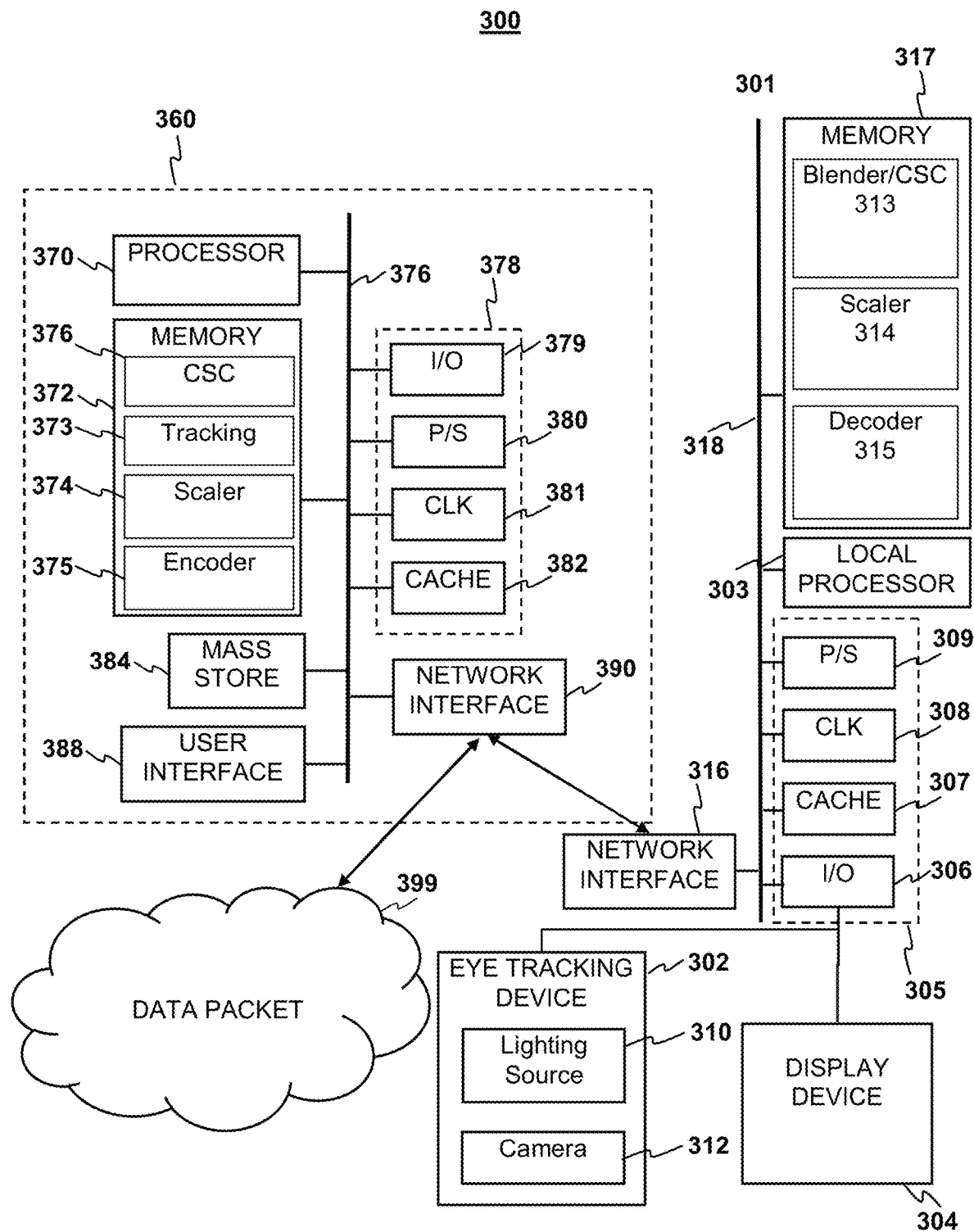
FIG. 3 is a block diagram depicting a system according to aspects of the present disclosure.

FIG. 3 depicts an example system 300 to further illustrate various aspects of the present disclosure. The system 300 may include a computing device 360 which is coupled to an eye tracking display system 301. The eye tracking display device 301 comprises, a local processor 303, local memory 317, well known support circuits 305, a network interface 316, an eye tracking device 302 and a display device 304 in order to perform eye gaze tracking and/or calibration for eye tracking in accordance with aspects of the present disclosure. The display device 304 may be in the form of a cathode ray tube (CRT), flat panel screen, touch screen, or other device that displays text, numerals, graphical symbols, or other visual objects. The local processor 303 may be configured according to well-known architectures, such as, e.g., single-core, dual-core, quad-core, multi-core, processor-coprocessor, cell processor, and the like. The eye tracking display system 301 may also include one or more memory units 317 (e.g., random access memory (RAM), dynamic random access memory (DRAM), read-only memory (ROM), and the like).

The local processor unit 303 may execute one or more programs, portions of which may be stored in the memory 317, and the processor 303 may be operatively coupled to the memory 317 e.g., by accessing the memory via a data bus 318. The programs may be configured to create foveated video for the eye tracking display system 301. By way of example, and not by way of limitation, the programs may include a video stream blending program and CSC 313, a video stream scaling program 314, and decoder programs 315. By way of example, and not by way of limitation, blender/CSC 313 may include processor executable instructions which cause the system 301 combine a video stream received from the Scaler program 314 and a subsection stream received from the decoder program 315 to create a foveated video for display on the display device 304. The scaler 314 may contain instruction that when executed cause the local processor to up-scale a video stream, received from the decoder 315. The decoder program 315 may contain instruction when executed by the local processor that causes the system to receive and decode encoded video stream data from the network interface 316. The decoder programs alternately may be implemented as discrete logical units (not shown) communicatively coupled to the local processor by e.g. the main bus 318. According to aspects of the present disclosure, eye tracking display device 301 may be an embedded system, mobile phone, personal computer, tablet computer, portable game device, workstation, game console, head mounted display device and the like. Moreover the computing device 360 may also be an embedded system, mobile phone, personal computer, tablet computer, portable game device, workstation, game console, and the like.

The eye tracking display device 301 may be coupled to the computing device 360, and may include a dynamic lighting source 310 similar to light sources 110 of FIGS. 1A-1B. By way of example, and not by way of limitation, the lighting source 310 may be an invisible lighting source in the form of one or more infrared LEDs, which may be configured to illuminate a user's eyes in order to gather eye tracking data with the sensor 312. The sensor 312 of the eye tracking device may be a detector which is sensitive to light emitted from the light source 310. For example, the sensor 312 may be a camera sensitive to the light source such as an infrared camera, and the camera 312 may be positioned relative to the eye tracking device and the lighting source so that it may capture images of an area illuminated by the lighting source 310.

The computing device 360 may be configured to operate in coordination with the eye tracking display system 301, in order to perform eye gaze tracking and determine lighting conditions in accordance with aspects of the present disclosure. The computing device 360 may include one or more processor units 370, which may be configured according to well-known architectures, such as, e.g., single-core, dual-core, quad-core, multi-core, processor-coprocessor, cell processor, and the like. The computing device 360 may also include one or more memory units 372 (e.g., random access memory (RAM), dynamic random access memory (DRAM), read-only memory (ROM), and the like).

The processor unit 370 may execute one or more programs, portions of which may be stored in the memory 372, and the processor 370 may be operatively coupled to the memory 372, e.g., by accessing the memory via a data bus 376. The programs may be configured to perform eye gaze tracking and determine lighting conditions for the system 300. By way of example, and not by way of limitation, the programs may include gaze tracking programs 373, execution of which may cause the system 300 to track a user's gaze, By way of example, and not by way of limitation, the gaze tracking programs 373 may include processor executable instructions which cause the system 300 to determine one or more gaze tracking parameters of the system 300 from eye tracking data gathered with the camera 312 while light is emitted from the dynamic lighting source 310. The gaze tracking programs 373 may also include instructions which analyze images gathered with the camera 312, e.g., as described above with respect to FIG. 1B. The encoder programs alternately may be implemented as discrete logical units (not shown) communicatively coupled to the local processor by e.g. the main bus 318.

In some implementations, the gaze tracking program 373 may analyze gaze tracking information to predict periods in which the user's visual percept is obscured, e.g., during blinks, or inactive, e.g., during saccades. Predicting the onset of such periods can be used to reduce unnecessary rendering computations, power consumption and network bandwidth usage. Examples of such techniques are described in commonly-assigned U.S. patent application Ser. No. 15/086,953, filed Mar. 31, 2016, the entire contents of which are incorporated herein by reference.

The computing device 360 and the eye tracking display device 301 may also include well-known support circuits 378 305, such as input/output (I/O) circuits 379 306, power supplies (P/S) 380 309, a clock (CLK) 381 308, and cache 382 307, which may communicate with other components of the system, e.g., via the bus 376 318, respectively. The computing device 360 may include a network interface 390 to facilitate communication with similarly configured network interface 316 on the eye tracking display device 301. The processor units 370 303 and network interfaces 390 316 may be configured to implement a local area network (LAN) or personal area network (PAN), via a suitable network protocol, e.g., Bluetooth, for a PAN. The computing device 360 may optionally include a mass storage device 384 such as a disk drive, CD-ROM drive, tape drive, flash memory, or the like, and the mass storage device 384 may store programs and/or data. The computing device 360 may also include a user interface 388 to facilitate interaction between the system 300 and a user. The user interface 388 may include a keyboard, mouse, light pen, game control pad, touch interface, or other device.

The system 300 may also include a controller (not pictured) which interfaces with the eye tracking display device 301 in order to interact with programs executed by the processor unit 370. The system 300 may also execute one or more general computer applications (not pictured), such as a video game or video stream, which may incorporate aspects of eye gaze tracking as sensed by the tracking device 302 and processed by the tracking programs 373, CSC 376, Scaler 374 that convert the video frame data to a form that can be presented by a display device, and video stream encoder 375.

The computing device 360 may include a network interface 390, configured to enable the use of Wi-Fi, an Ethernet port, or other communication methods. The network interface 390 may incorporate suitable hardware, software, firmware or some combination thereof to facilitate communication via a telecommunications network. The network interface 390 may be configured to implement wired or wireless communication over local area networks and wide area networks such as the Internet. The network interface 390 may also include the aforementioned wireless transceiver that facilitates wireless communication with the eye tracking device 302 and display device 379. The computing device 360 may send and receive data and/or requests for files via one or more data packets 399 over a network.

Foveated Video

As an aspect of the current disclosure foveated video can reduce the transmission bandwidth requirements and computational load of high resolution video processing, while still preserving essential details in regions of interest in the image presented by the display. Foveated video reduces computation by performing low loss compression or no compression on high resolution video frame subsections in the regions of interest (ROI) of the displayed image where the fovea is focused and performing downscaling and high compression on the video frame outside this region. To utilize foveated video, an image display device, such as a head-mounted display (HMD) would use eye gaze tracking technology to determine where the user is focusing on the screen.

Figure 2A:
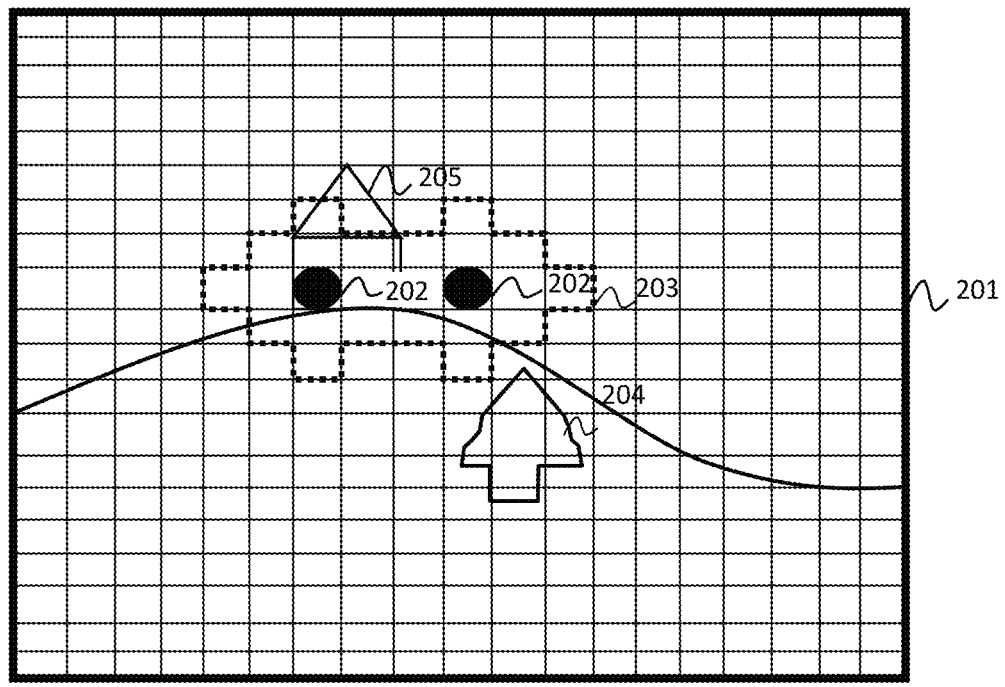
FIGS. 2A-2B are diagrams illustrating an example of foveated video.
Figure 2B:
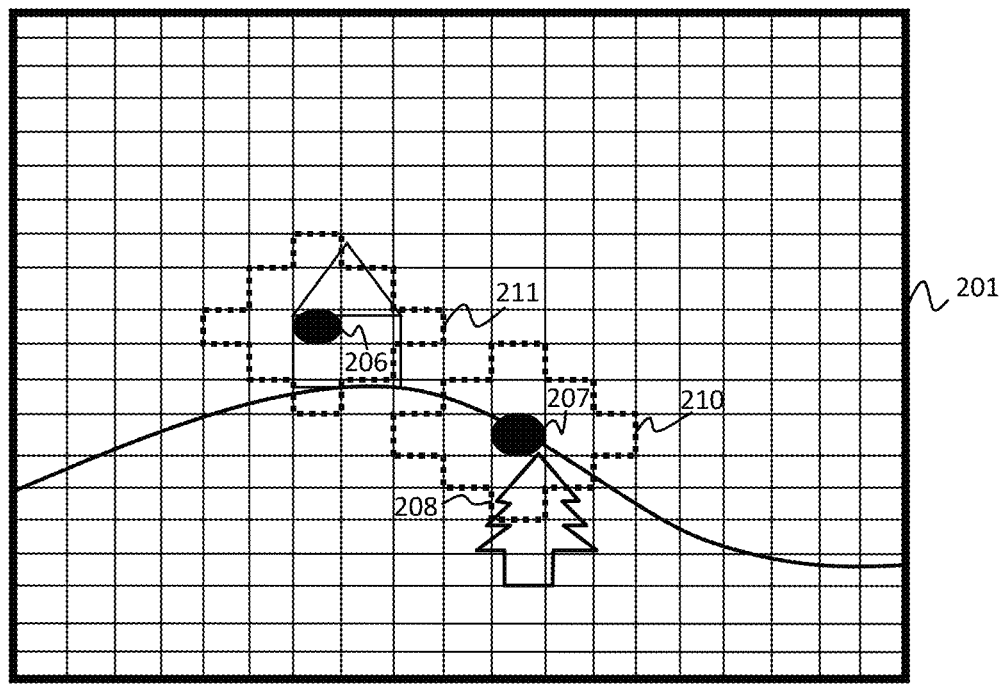

The foveated video may be configured to display high resolution images in the ROI of the viewer as determined by the gaze tracking system. FIGS. 2A and 2B depicts a foveated video image 201 according to an aspect of the current disclosure. In the image 201 an ROI 203 may be an area determined by eye gaze tracking to be directly in front of the center of gaze 202 (sometimes called the fovea) of the user. Within 20 degrees of the gaze center the viewer's visual acuity is highest. Thus it is advantageous to display this portion of the image 201 at high resolution. As an aspect of the current disclosure the ROI 203 may be a region of the screen selected to be within 20 degrees from the center a viewer's gaze 202. The ROI may be any shape, including but not limited to two overlapping circular regions or two adjacent squares. Generally the ROI will consist of two regions next to each other but other shapes will work including but without limitation a single rectangular region or a single ovoid region or two non-adjacent circular regions.

According to aspects of the present disclosure video data corresponding to the image 201 may be encoded so that sections 205 of the image within the ROI 203 are displayed at high resolution and sections 204 outside of the ROI 203 are displayed at a reduced resolution. Using reduced resolution for the sections 204 outside the ROI 203 of the viewer allows for reduced bandwidth usage during transmission of the video stream and reduced latency while encoding the stream without a loss in perceived video quality by the viewer. In some implementations there may be a transition area at the edge of the ROI 203 where the low and high resolution sections are blended to create a gradual transition between high and low resolution.

The ROI 203 may change location from frame to frame within the video stream. A viewer's attention to an area within a video image may change as the video progresses. According to an aspect of the current disclosure as seen in FIG. 2B a gaze tracking system may detect a movement in the primary gaze points 206, 207 for a viewer's left and right eyes and in response the system moves the ROI 210, 211 to correspond to the new gaze point along the gaze point movement vector. High resolution Video stream sections 208 within the new ROI 210 and 211 may be fetched in response to the change in the location of the primary gaze points. Alternatively the probability of a gaze point and region of interest being located in a certain area of the video stream may be predicted by algorithm as known in the art such as those described in "How to find interesting locations in video: a spatiotemporal interest point detector learned from human eye movements" by Kienzle, Wolfe et al. available at: http://www.kyb.mpg.de/fileadmin/user_upload/files/publications/attachments/50_4486%5b0%5d.pdf, the contents of which are incorporated herein by reference. Based on the probable gaze point information the system may fetch several high resolution areas and send them to the display where the final image displayed is determined by the actual gaze point determined by the gaze tracker. It should be noted that latency between the display of high resolution areas after movement of the ROI is not as important because generally quick eye movement imitates a saccade event and motion blurs image sections between a first ROI and the next.

In another embodiment of the present disclosure the gaze tracking system may predict the probability of movement of the ROI from one section of the video stream to another section of the video. Such a prediction may be based upon the movement velocity vector of the gaze point of the viewer. The system may also use probable gaze point information as discussed above to further refine prediction of the ROI location.

Video Coding

Figure 2C:
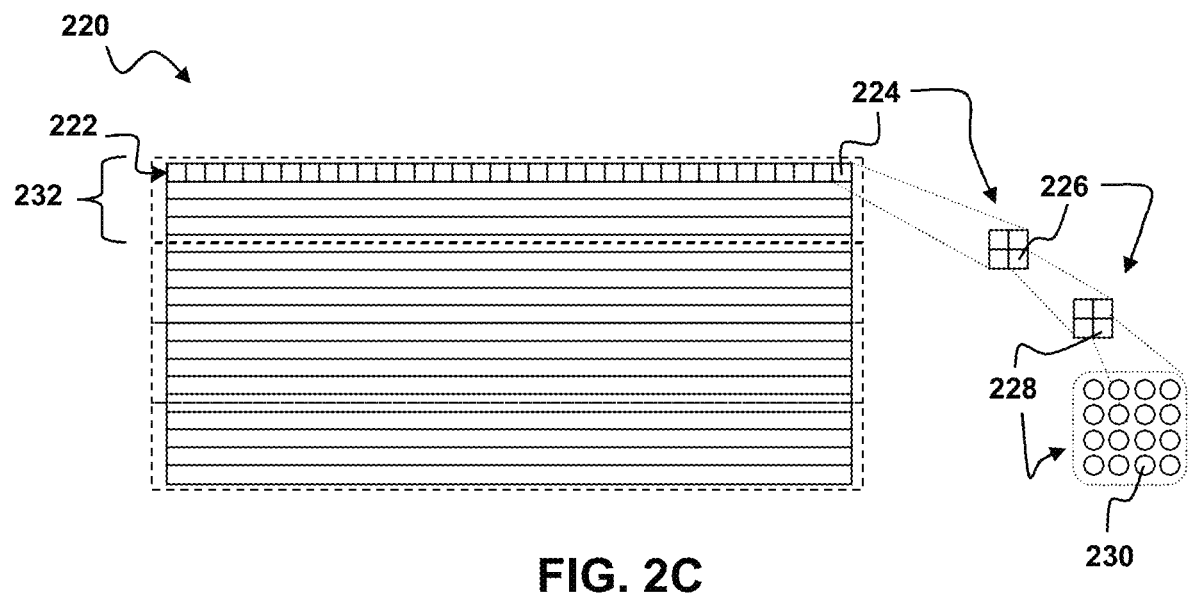
FIG. 2C is a schematic diagram illustrating one possible division of a video frame within the context of aspects of the present disclosure.

Certain aspects of the present disclosure related to video encoding may be better appreciated in light of the following discussion. By way of example, and not by way of limitation, as shown in FIG. 2C, a single digital picture 220 (e.g., a digital video frame) may be broken down into one or more sections. As used herein, the term "section" can refer to a group of one or more luma or chroma samples within the picture 220. A section can range from a single luma or chroma sample within the picture, up to the whole picture. Non-limiting examples of sections include slices (e.g., macroblock rows) 222, macroblocks 224, sub-macroblocks 226, blocks 228 and individual pixels 230. As illustrated in FIG. 2C, each slice 222 contains one or more rows of macroblocks 224 or portions of one or more such rows. The number of macroblocks in a row depends on the size of the macroblocks and the size and resolution of the picture 220. For example, if each macroblock contains sixteen by sixteen chroma or luma samples then the number of macroblocks in each row may be determined by dividing the width of the picture 220 (in chroma or luma samples) by sixteen. Each macroblock 224 may be broken down into a number of sub-macroblocks 226. Each sub-macroblock 226 may be broken down into a number of blocks 228 and each block may contain a number of chroma or luma samples 230. By way of example, and without limitation of the invention, in a common video coding scheme, each macroblock 224 may be broken down into four sub-macroblocks 226. Each sub-macroblock may be broken down into four blocks 228 and each block may contain a four by four arrangement of sixteen chroma or luma samples 230. Some codecs, such as H.265, allow a given picture to be broken down into two or more sections of different sizes for encoding. In particular, the H.265 standard introduces the "tile" concept of partitioning a picture. Tiles are independently decodable regions of a picture that are encoded with some shared header information. Tiles can additionally be used for the purpose of spatial random access to local regions of video pictures. A typical tile configuration of a picture consists of segmenting the picture into rectangular regions with approximately equal numbers of coding units (CUs) in each tile. A coding unit is analogous to a macroblock (MB) in the H.264 standard. However, the size of the CU can be set by the encoder, and can be larger than a macroblock. The size of the CU can be flexible and adaptive to video content for best partitioning of the picture.

It is noted that each picture may be either a frame or a field. A frame refers to a complete image. A field is a portion of an image used for to facilitate displaying the image on certain types of display devices. Generally, the chroma or luma samples in an image are arranged in rows. To facilitate display an image may sometimes be split by putting alternate rows of pixels into two different fields. The rows of chroma or luma samples in the two fields can then be interlaced to form the complete image. For some display devices, such as cathode ray tube (CRT) displays, the two fields may simply be displayed one after the other in rapid succession. The afterglow of the phosphors or other light emitting elements used to illuminate the pixels in the display combined with the persistence of vision results in the two fields being perceived as a continuous image. For certain display devices, such as liquid crystal displays, it may be necessary to interlace the two fields into a single picture before being displayed. Streaming data representing encoded images typically includes information indicating whether the image is a field or a frame. Such information may be included in a header to the image.

Modern video coder/decoders (codecs), such as MPEG2, MPEG4 and H.264 generally encode video frames as one of three basic types known as Intra-Frames, Predictive Frames and Bipredicitve Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames. Video frames are often encoded as I-frames when a scene change is detected in the input video.

P-frames require the prior decoding of some other picture (s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded.

Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

There are typically two prediction modes for P-frames and B-frames generally referred to as inter prediction and intra prediction. Inter prediction is based on sections of a different frame than the one being encoded. Intra prediction is based on sections within the frame being encoded. Many codecs include a prediction mode decision process that compares the bitrate usage for both modes before making a final determination of which mode to use to encode a particular frame or section within a frame. The coding of I-frames does not require motion search or prediction mode decision.

For encoding digital video pictures, an encoder receives a plurality of digital images and encodes each image. Encoding of the digital picture may proceed on a section-by-section basis. The encoding process for each section may optionally involve padding, image compression and motion compensation. As used herein, image compression refers to the application of data compression to digital images. The objective of the image compression is to reduce redundancy of the image data for a give image in order to be able to store or transmit the data for that image in an efficient form of compressed data.

Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability.

CABAC is a form of entropy encoding used in the H.264/MPEG-4 AVC and High Efficiency Video Coding (HEVC) standards. CABAC is notable for providing much better compression than most other entropy encoding algorithms used in video encoding, and it is one of the key elements that provide the H.264/AVC encoding scheme with better compression capability than its predecessors. However, it is noted that CABAC uses arithmetic coding which may requires a larger amount of processing to decode.

Context-adaptive variable-length coding (CAVLC) is a form of entropy coding used in H.264/MPEG-4 AVC video encoding. In H.264/MPEG-4 AVC, it is used to encode residual, zig-zag order, blocks of transform coefficients. It is an alternative to CABAC. CAVLC uses a table look-up method and thus requires considerably less processing for decoding than CABAC, although it does not compress the data quite as effectively. Since CABAC tends to offer better compression efficiency (about 10% more compression than CAVLC), CABAC is favored by many video encoders in generating encoded bitstreams.

Reduction in Motion Sickness

According to aspects of the current disclosure the system may be able to reduce the chance that motion sickness will occur in the viewer through a reduction in the size of the high resolution ROI. The system may detect that a viewer is experience motion related sickness through means known in the art including but not limited to, heart rate, body temperature, galvanic skin response or Electro cardiogram (ECG). More information on detecting motion sickness can be found at "How to Deal with Motion Sickness in Virtual reality" by Patroa, Bruno et al. available at: http://scitecin-isr.uc.pt/Proceedings/Papers/EPCGI/17.pdf, which is incorporated herein by reference. In another embodiment of the current disclosure the system detects a potential for motion sickness to occur through monitoring the data rate of the video stream. The data rate of the video stream is related to the amount of displayed data on the screen therefore a high data rate is indicative of an increased likelihood of motion sickness as there will be a large amount of newly displayed information.

According to additional aspects of the current disclosure the system may also employ viewer feedback to reduce motion sickness. In one embodiment of the system a tactile response from the viewer is employed to initiate the motion sickness reduction scheme. The system may also collect the response from viewers and use statistical analysis of the responses to generate a model for potential motion sickness within the video stream. In another embodiment the system may use a user defined motion sickness threshold which when a variable for example; video stream data rate, or motion vectors within the video, exceeds the threshold the motion sickness reduction scheme is initiated.

Upon detection of a motion sickness related response the system may narrow the displayed area of the ROI to reduce the amount of high resolution information displayed to the viewer. The system may blend the a larger amount high resolution section of the displayed area with the low resolution video stream to generate a smaller high resolution section with a large but gradual degradation in quality around the edges of the ROI.

Quality Blending and Peripheral Dimming

A sharp degradation in image resolution from the ROI to the rest of the image can be jarring to the viewer. As such according to aspects of the current disclosure the edges of the high resolution area may be blended with the low resolution area to create a quality degradation gradient between the areas. Such a degradation gradient may be a linear or non-linear transition from high resolution to low resolution. By way of example, a non-linear transition may be a sigmoidal ("S"-shaped) function transition between high and low resolution with respect to distance from the region of interest. In general, the integral of any smooth, positive, "bump-shaped" function will be sigmoidal. Examples of sigmoid functions include, but are not limited to, the logistic function, the generalized logistic function, sigmoid functions include the ordinary arctangent, the hyperbolic tangent, the Gudermannian function, and the error function erf $$(x) = \frac{2}{\sqrt{\pi}} \int_0^x e^{t^2} dt),$$

the complementary error function (1-erf(x)), and algebraic functions like $$f(x) = \frac{x}{\sqrt{1+x^2}}.$$

The logistic function has the form $$f(x) = \frac{L}{1 + e^{-k(x-x_0)}},$$

where:
  $x_0$=the x-value of the sigmoid's midpoint,
  L=the curve's maximum value, and
  k=the steepness of the curve.

Additionally the system may use video streams of multiple resolutions around the edges of the ROI to generate a smoother degradation in quality between the high resolution area and the rest of the display.

In other aspects of the current disclosure the areas surrounding the ROI may be dimmed to save power and create a theater like effect. The dimming function may be a function selected by the viewer or embedded in the video stream.

Implementation

Figure 4:
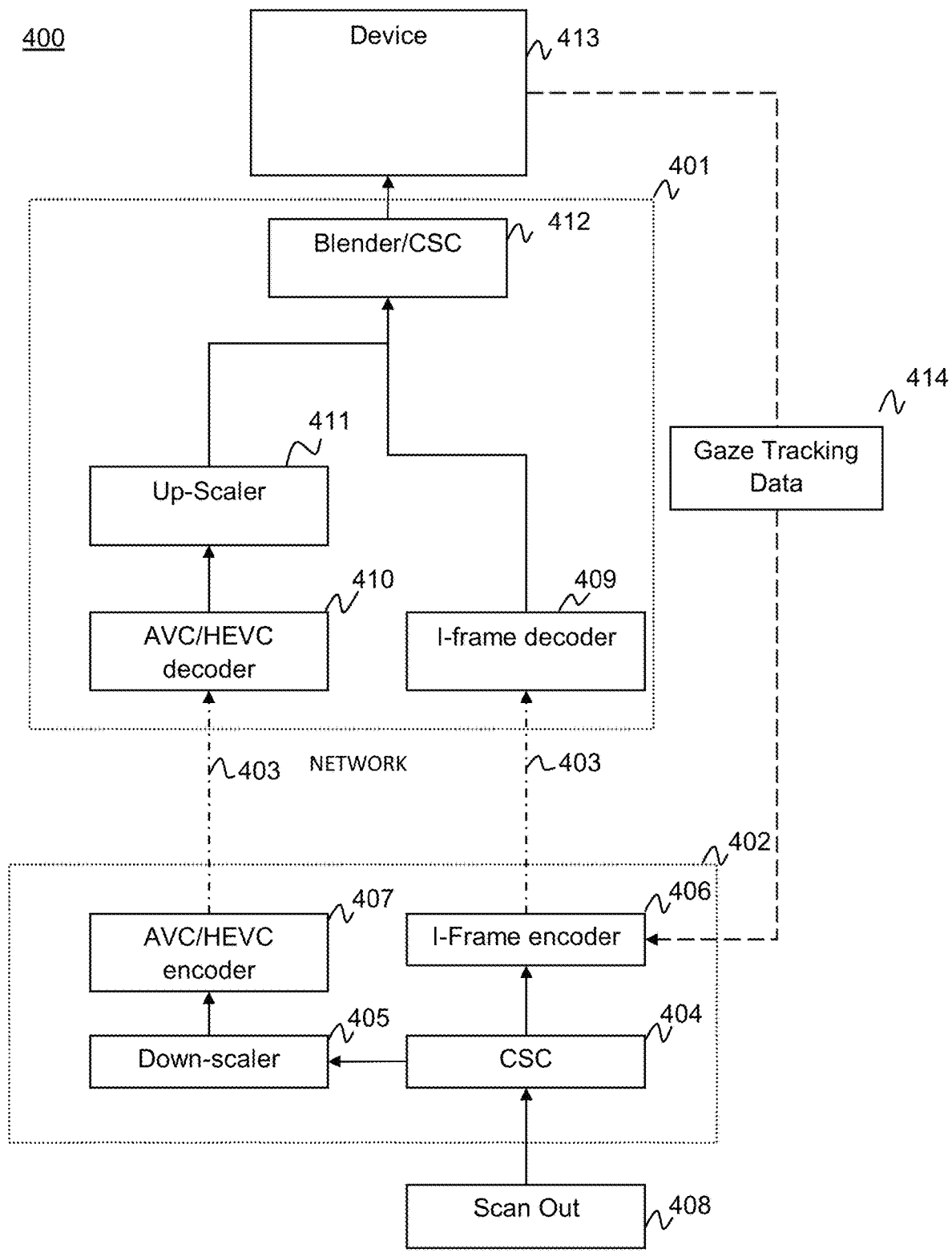
FIG. 4 is a flow diagram of the overall system according to aspects of the present disclosure FIGS. 5A-5B. are flow diagrams depicting sides of the encoder group according to aspects of the present disclosure.

FIG. 4 illustrates a system 400 according to aspects of the present disclosure. The illustrated system 400 is comprised of two computing groups, an encoding group 402 and a decoding group 401. The encoding group 402 is coupled to the decoding group 401 via a network 403 which may, for example, be a wireless network, wired local area network connection (LAN), USB connection, serial connection or other device connection wires known in the art. The encoding group 401 comprises; a Color Space Conversion (CSC) 404, a down scaler 405, a Region of Interest (ROI) I-Frame encoder 406 and a scaled image AVC/HEC encoder 407. The decoder group comprises an ROI I-Frame decoder 409, a AVC/HEV decoder 410, an up-scaler 411, and a video stream blender/CSC 412. Additionally the decoder group is coupled to the display device. The gaze tracking unit may be coupled to the display device 413 and is configured to transmit gaze tracking information 414 to the ROI I-frame encoder 406 in the encoder group 402.

The Encoding group may receive an unencoded video data stream from a scanout unit 408. The unencoded video data stream may include video data from a video game or an encoded data-stream which must be decoded before being re-encoded for use by the currently disclosed system (not shown). The initial unmodified video stream is then sent to the CSC 404 which converts the video data stream to a form that is suitable for encoding. For example the color space for the image may be converted from RGB, which is more typical for displays, to YUV color space, which is more typical for encoders. The CSC 404 then passes the initial video stream to the ROI I-Frame Encoder 406 and the Downscaler 405.

Figure 5A:
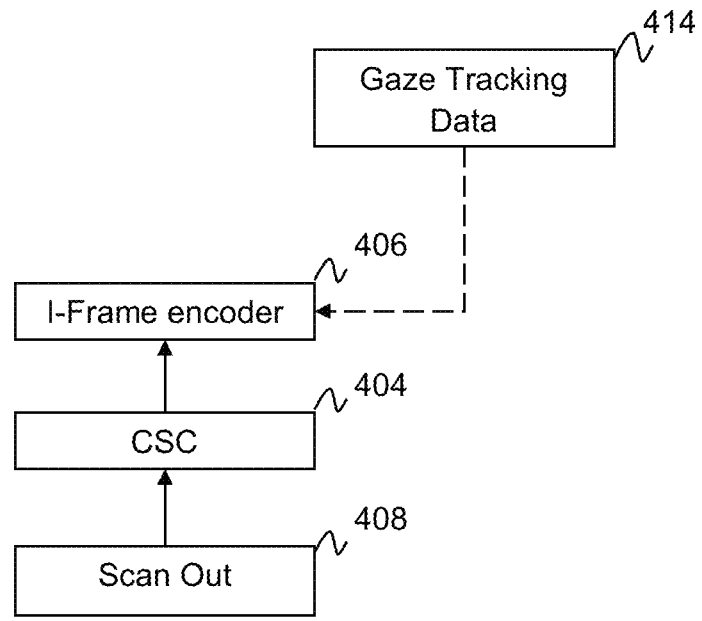

FIG. 5A shows the ROI encoder side of the encoder group. The ROI I-frame encoder 406 receives gaze tracking information 414 received from the gaze tracker. According to an aspect of the current disclosure the ROI I-Frame encoder 406 may use the gaze-tracking information 414 to determine an ROI within the initial video stream. The ROI I-Frame encoder only encodes the subsections of the initial video stream images which are located in the ROI.

The shape of encoded subsections corresponding to the ROI may be coded as a square alternatively the shape may be a circle, oval, rectangle or other regular or irregular shapes. There may be two ROI sections encoded by the ROI I-Frame encoder corresponding to the two eyes of the viewer. The gaze tracking system may detect the presence or absence of an eye and the ROI I-frame encoder may adjust the number of encoded sections to account for the absence of an eye. Alternatively the ROI I-Frame encoder may have logic configured to display a single wide section in the ROI for both eyes.

According to aspects of the present disclosure the sections of the image that make up the ROI may be larger than the actual ROI of the viewer to account for any minor variations in vision radius and sudden eye movement. The sections of the image that make up the ROI may be of any suitable size, for example 20 macro blocks wide by 20 macro blocks long. The size of the ROI sections may be reduced during a Zoom-in action or increased in a Zoom out action to reduce motion sickness. As discussed in prior sections the encoded subsections may also be reduced in size to reduce motion sickness during display of the video stream.

The ROI I-frame encoder 406 only encodes the subsections of the images in the video stream in the ROI as Intra frames (I-Frames) in order to reduce latency and frame level delay. By encoding the ROI as an I-frame, certain time-consuming operations, e.g., motion search and encoding mode decision are omitted, thereby reducing latency. Because the ROI is relatively small compared to the size of the frame, fewer bits are required for an I-frame encoded ROI than for a normal I-Frame that encompasses an entire image. The ROI I-Frame encoder may use any low loss encoder known in the art. An example of a low loss encoder suitable for this purpose without limitation is the X.264, H.264 lossless encoder. Sections of the video image outside the ROI need not be encoded or transmitted by the ROI I-frame encoder. The low loss encoded subsections of the video image hereinafter referred to as low compression sections, may have their locations within the original video frame written to a frame header of the low compression sections so that a decoder can subsequently reconstruct the ROI in the correct location within the frame. Once the low compression subsections have been processed they are sent through the network to the decoder side.

Figure 5B:
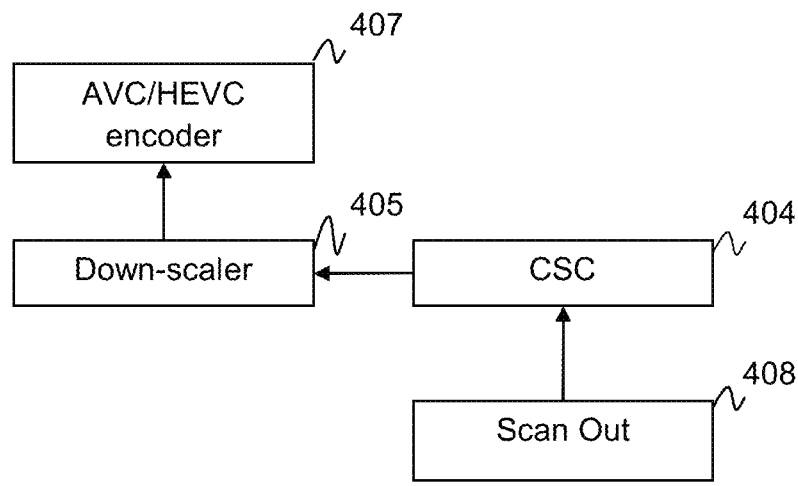

FIG. 5B depicts the high compression side of the encoder group. The down-scaler 405 may receive the initial video frame from the CSC 404. The down-scaler 405 may apply a size reduction algorithm to the video frame to reduce the data rate required to transmit the video stream and processing power required for encoding. Any scaling algorithm may be used for this process as would be known to one of ordinary skill in the art. Examples of suitable algorithms without limitation would be, a bilinear interpolation, cubic interpolation or Lanczos resampling.

The AVC/HEV encoder 407 may then receive the downscaled video frame from the downscaler 405. The downscaled video stream is then encoded using a lossy encoder to reduce encoding time and bandwidth requirement. Suitable encoders for the present applicant may be, without limitation; H.264/AVC, or H.265/HEVC. Once encoded the video frame hereinafter the "high compression video frame" is sent to the decoder side through the network.

Figure 6A:
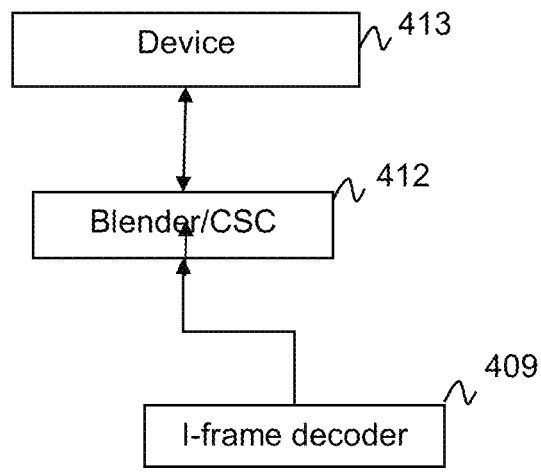
FIG. 6A-6B are flow diagrams depicting sides of sides of the decoder group according to aspects of the present disclosure.
Figure 6B:
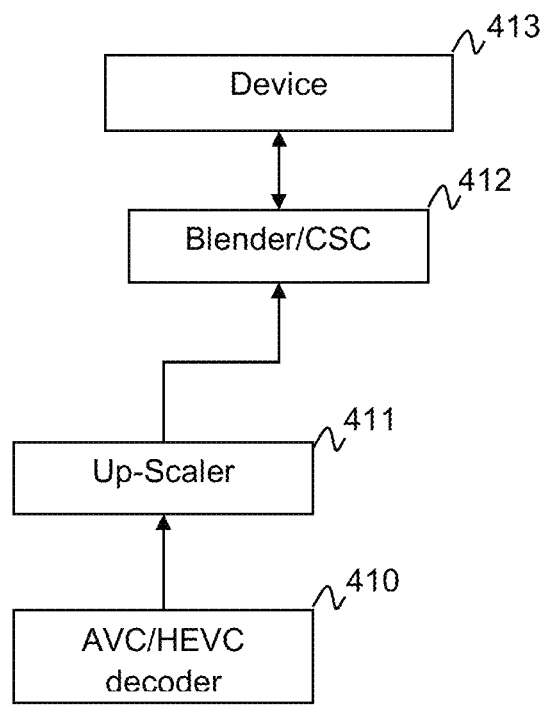

FIG. 6A shows the I-Frame decoder side of the decoder group. The I-frame decoder 409 receives the low compression section data from the I-Frame encoder over the network. The low compression section data is then decoded by the I-frame decoder 409 and the decoded sections are sent to the Blender/CSC 412. Known low loss decoders would be suitable for the currently disclosed application including but not limited to, FFmpeg.

Frame 6B depicts the high compression side of the decoder group. According to aspects of the present disclosure the AVC/HEVC decoder 410 receives the High compression video over the network from the encoder group. The high compression video stream is decoded using a suitable decoder and sent to the up-scaler 411.

The up-scaler 411 receives the downscaled video stream from the AVC/HEVC decoder 410. The downscaled video stream is then up-scaled using an appropriate upscaling algorithm to match the algorithm applied in the encoder group. The up-scaled video stream is then sent to blender/CSC 412.

The Blender/CSC 412 receives the video stream from the up-scaler 411 and the subsection stream from the I-frame decoder 409. According to aspects of the current disclosure the Blender/CSC 412 may read the Frame header of the subsection stream to determine the location within the video stream to place the subsections. Alternatively the Blender/CSC may be synchronized with the ROI I-Frame encoder to use the gaze tracking data 414 to determine the location of placement for the subsection stream (not shown). According to additional aspects of the current disclosure the Blender/CSC 412 may receive the location for the subsection stream over other channels such as a separate wired or wireless transmission (not shown).

The subsection stream may be blended with the video stream at the Blender/CSC 412. Blending may be accomplished by applying a mask to the subsection stream and the video stream. The mask will set weights for pixel values in images of the subsection stream and the video stream. The mask may define a linear resolution degradation gradient between the high resolution subsection stream and the low resolution video stream. According to alternate aspects of the current disclosure the mask may define a non-linear resolution degradation gradient. The Blender/CSC 412 will then combine the subsection stream and the video stream by superimposing the subsection stream on top of the video stream at the proper location and applying the set pixel values on the images so that the high resolution image and low resolution images are blended according to pixel value weight.

The mask applied to the image may determine the shape of the displayed ROI subsections. As such the size and shape of the displayed ROI subsections may be varied at the Blender/CSC 412. The size and shape of the ROI may be fixed or varied in logic. The Blender/CSC 412 may take an ROI shape from the ROI I-Frame encoder and further refine the edges of the ROI. The mask may also be used to define pixel values for the video stream to implement peripheral dimming.

The Blender/CSC 412 may also take a subsection stream with more than one potential ROI subsection and determine the correct ROI of the viewer from gaze tracking data. Accordingly the Blender/CSC 412 will apply a mask to the potential ROI subsection which hides them from view while not hiding the correct ROI subsection.

In an alternate embodiment a single mask is applied to the ROI subsection stream at Blender/CSC 412 and the ROI subsection stream is then superimposed upon the video stream with mixing according to the pixel weights applied to the ROI subsection stream. This mixing scheme may also be applied at the ROI I-Frame encoder. In such an embodiment the mask pixel values are applied at the ROI I-Frame encoder and then at the Blender/CSC 412 the ROI subsection stream is blended with the video stream according to those mask pixel values.

According to additional aspects of the current disclosure the Blender/CSC 412 may implement the motion sickness reduction scheme as discussed above by varying the mask size or shape based on the motion sickness response. The Blender/CSC 412 may also vary the resolution gradient as a part of the motion sickness reduction scheme.

Figure 7:
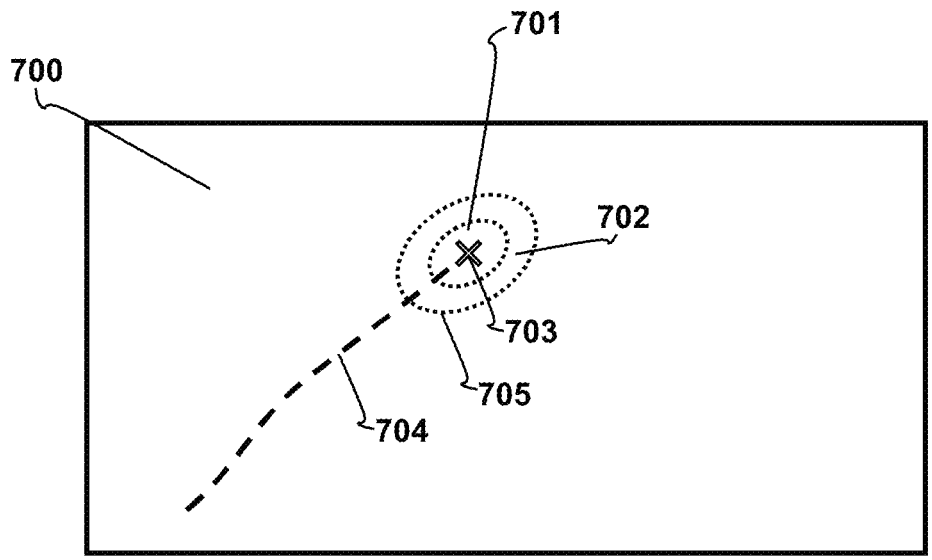
FIG. 7 is a schematic diagram of a screen space illustrating an example of a region of interest in accordance with aspects of the present disclosure

FIG. 7 depicts a masked foveated video according to aspects of the current disclosure. The foveated display may have one or more high resolution subsections 701 around the central gaze point or ROI of the viewer 703. The system may apply a mask around the edges of the high resolution 702 to achieve a resolution degradation gradient between the high resolution subsections 701 and the low resolution background 700. The system may use gaze tracking data to predict a movement vector 704 for the ROI. In other embodiments the area of masked sections 702 may be enlarged in response to a motion sickness response. Alternatively the encoded high resolution area 705 may be reduced due to a motion sickness response.

Figure 8:
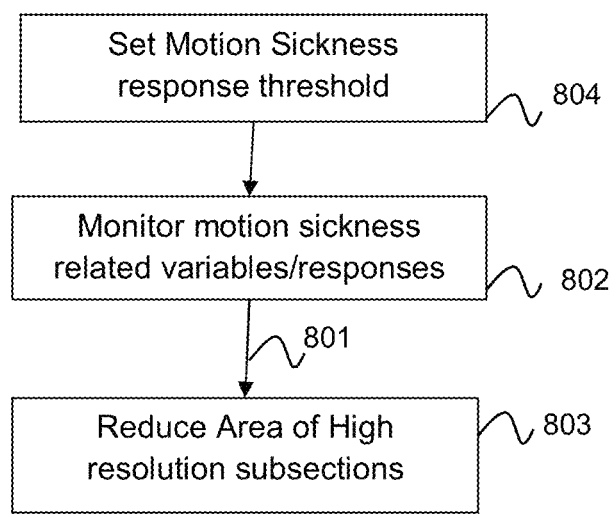
FIG. 8 is a flow diagram depicting a motion sickness reduction scheme according to aspects of the present disclosure.

FIG. 8 depicts a block diagram of the motion sickness reduction scheme. The motion reduction scheme 800 may run either on the encoder side 402 or the decoder side 401 of the foveated display system of FIG. 4. The viewer of a foveated video may a set threshold level of movement above which the viewer experiences motion sickness 804. Alternatively the threshold level 804 may be determined by an average motion sickness response from viewers or from an empirically determined physiologic response due to motion sickness. The system continuously measures variables within the video stream or sensor data to determine whether a response has exceeded the set threshold level 802. Monitoring may either be at the eye tracking display device 301 or the computing device 360 shown in FIG. 3. According to additional aspects of the present disclosure the threshold may be manually triggered by the viewer. If the device determines that a motions sickness threshold has been exceeded the system will notify 801 either the ROI I-Frame encoder 406 or the Blender/CSC 412 to reduce the displayed high resolution area 701.

Other Display Implementations

Although examples are described herein with respect to head mounted display (HMD) applications, aspects of the present disclosure are not limited to such implementations. HMD implementations represent a relatively straightforward implementation because the relative locations of the user's eyes and the display screen remain more or less fixed. In principle, however, the disclosed system and method may be adapted to any image display system that can work with gaze tracking. The gaze tracking system may be modified to track the location and orientation of the user's head and eye(s) relative to the display screen in implementations where these are not fixed.

Figure 9A:
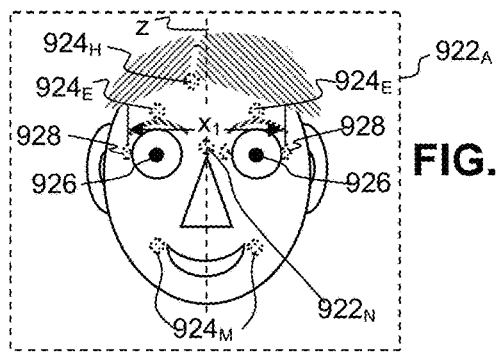
FIGS. 9A-9H are schematic diagrams illustrating examples of the use of eye gaze and face tracking in conjunction with embodiments of the present invention.
Figure 9C:
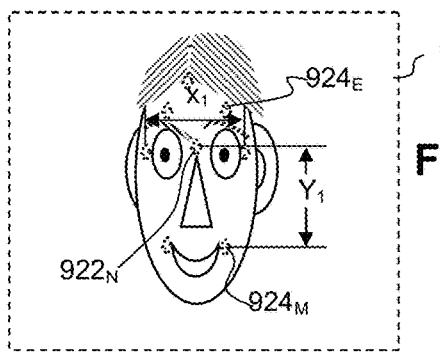
Figure 9B:
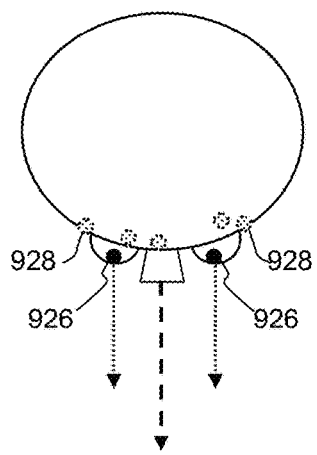
Figure 9D:
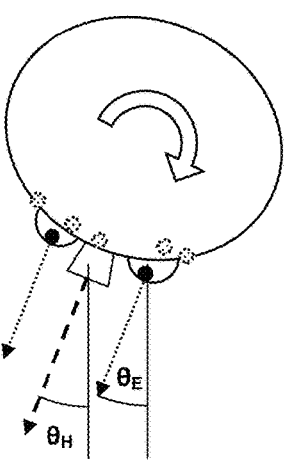

FIGS. 9A-9H illustrate examples of the use of facial orientation and eye gaze direction in conjunction with aspects of the present disclosure. As seen in FIG. 9A a face 920 of a user may appear in an image 922$_A$ obtained with a camera trained on the user. Such cameras are common features of devices such as laptop computers, smart phones, and tablet computers. Image analysis software may identify reference points on the face 920. The software may characterize certain of these reference points, e.g., located at the corners of the mouth 924$_M$, the bridge of the nose 924$_N$, the part in the hair 924$_H$, and at the tops of the eyebrows 924$_E$, as being substantially fixed relative to the face 920. The software may also identify the pupils 926 and corners 928 of the user's eyes as reference points and determine the location of the pupils relative to the corners of the eyes. In some implementations, the centers of the user's eyes can be estimated from the locations of the pupils 926 and corners 928 of eyes. Then, the centers of eyes can be estimated and the locations of pupils can be compared with the estimated locations of the centers. In some implementations, face symmetry properties can be used.

The software can determine the user's facial characteristics, e.g., head tilt angle and eye gaze angle from analysis of the relative locations of the reference points and pupils 926. For example, the software may initialize the reference points 924$_E$, 924$_H$, 924$_M$, 924$_N$, 928 by having the user look straight at the camera and register the locations of the reference points and pupils 926 as initial values. The software can then initialize the head tilt and eye gaze angles to zero for these initial values. Subsequently, whenever the user looks straight ahead at the camera, as in FIG. 9A and the corresponding top view shown in FIG. 9B, the reference points 924$_E$, 924$_H$, 924$_M$, 924$_N$, 928 and pupils 926 should be at or near their initial values.

By way of example and not by way of limitation, the pose of a user's head may be estimated using five reference points, the outside corners 928 of each of the eyes, the outside corners 924$_M$ of the mouth, and the tip of the nose (not shown). A facial symmetry axis may be found by connecting a line between a midpoint of the eyes (e.g., halfway between the eyes' outside corners 928) and a midpoint of the mouth (e.g., halfway between the mouth's outside corners 924$_M$). A facial direction can be determined under weak-perspective geometry from a 3D angle of the nose. Alternatively, the same five points can be used to determine the head pose from the normal to the plane, which can be found from planar skew-symmetry and a coarse estimate of the nose position. Further details of estimation of head pose can be found, e.g., in "Head Pose Estimation in Computer Vision: A Survey" by Erik Murphy, in *IEEE TRANSACTIONS ON PATTERN ANALYSIS AND MACHINE INTELLIGENCE*, Vol. 31, No. 4, April 2009, pp 607-626, the contents of which are incorporated herein by reference. Other examples of head pose estimation that can be used in conjunction with embodiments of the present invention are described in "Facial feature extraction and pose determination", by Athanasios Nikolaidis *Pattern Recognition, Vol.* 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in *FG '00 Proceedings of the Fourth IEEE International Conference on Automatic Face and Gesture Recognition,* 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in *Image and Vision Computing*, Vol. 20, Issue 7, 20 Feb. 2002, pp 499-511, the entire contents of which are incorporated herein by reference.

When the user tilts his head, the relative distances between the reference points in the image may change depending upon the tilt angle. For example, if the user pivots his head to the right or left, about a vertical axis Z the horizontal distance $x_1$ between the corners 928 of the eyes may decrease, as shown in the image 922$_C$ depicted in FIG. 9C. Other reference points may also work, or be easier to detect, depending on the particular head pose estimation algorithm being used. The amount change in the distance can be correlated to an angle of pivot $\theta_H$ as shown in the corresponding top view in FIG. 1E. It is noted that if the pivot is purely about the Z axis the vertical distance $Y_1$ between, say, the reference point at the bridge of the nose 924$_N$ and the reference points at the corners of the mouth 924$_M$, would not be expected to change significantly. However, it would be reasonably expected for this distance $y_1$ to change if the user were to tilt his head upwards or downwards. It is further noted that the software may take the head pivot angle $\theta_H$ into account when determining the locations of the pupils 926 relative to the corners 928 of the eyes for gaze direction estimation. Alternatively the software may take the locations of the pupils 926 relative to the corners 928 of the eyes into account when determining head pivot angle $\theta_H$. Such an implementation might be advantageous if gaze prediction is easier, e.g., with an infrared light source on a hand-held device, the pupils could be located relatively easily. In the example, shown in FIG. 9C and FIG. 9D, the user's eye gaze angle $\theta_E$ is more or less aligned with the user's head tilt angle. However, because of the pivoting of the user's head and the three-dimensional nature of the shape of the eyeballs, the positions of the pupils 926 will appear slightly shifted in the image 922$_D$ compared to their positions in the initial image 922$_A$.

Figure 9E:
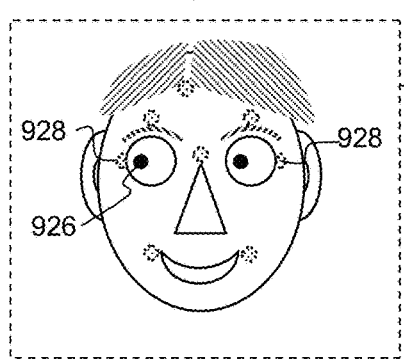
Figure 9G:
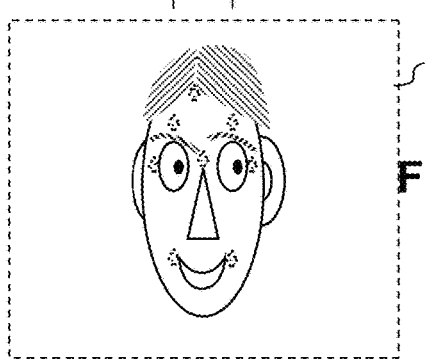
Figure 9F:
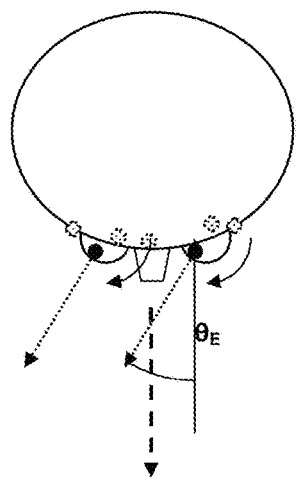

In some situations, the user may be facing the camera, but the user's eye gaze is directed elsewhere, e.g., as shown in FIG. 9E and the corresponding top view in FIG. 9F. In this example, the user's head is tilt angle $\theta_H$ is zero but the eye gaze angle $\theta_E$ is not. Instead, the user's eyeballs are rotated counterclockwise, as seen in FIG. 9F. Consequently, the reference points $924_E$, $924_H$, $924_M$, $124_N$, 928 are arranged as in FIG. 9A, but the pupils 126 are shifted to the left in the image $922_E$.

Figure 9H:
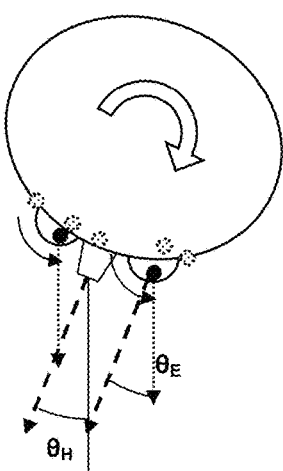

It is noted that the user's head may pivot in one direction and the user's eyeballs may pivot in another direction. For example, as illustrated in FIG. 9H and FIG. 9I, the user 101 may pivot his head clockwise and rotate his eyeballs counterclockwise. Consequently, the reference points $924_E$, $924_H$, $924_M$, $924_N$, 928 are shifted as in FIG. 9D, but the pupils 926 are shifted to the right in the image $922_G$ shown in FIG. 9G. The gaze tracking system 100, as described in FIGS. 1A-1B, may take this configuration or any of the configurations described above into account in determining the gaze direction GD of the user's eye E.

As may be seen from the foregoing discussion it is possible to track certain user facial orientation characteristics using just a camera. However, many alternative forms of facial orientation characteristic tracking setups could also be used. FIGS. 10A-10E illustrate examples of five facial orientation characteristic tracking systems that, among other possible systems, can be implemented according to embodiments of the present invention.

Figure 10A:
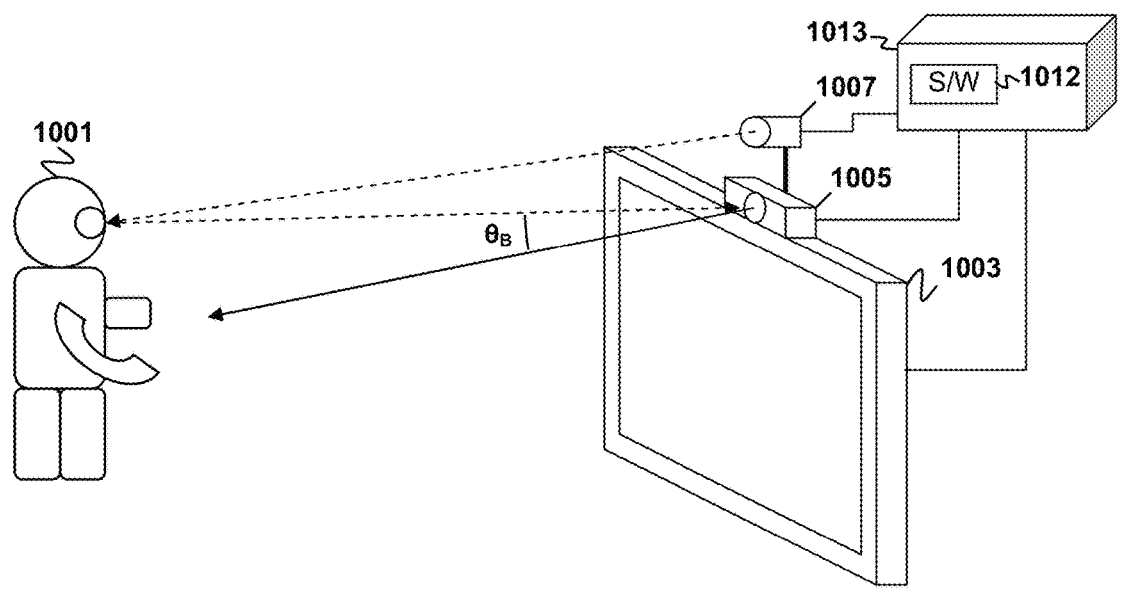
FIG. 10A-10D are schematic diagrams illustrating facial orientation characteristic tracking setups according to aspects of the present disclosure.

In FIG. 10A, the user 1001 is facing a camera 1005 and infrared light sensor 1007, which are mounted on top of a visual display 1003. To track the user's head tilt angle, the camera 1005 may be configured to perform object segmentation (i.e., track user's separate body parts) and then estimate the user's head tilt angle from the information obtained. The camera 1005 and infrared light sensor 1007 are coupled to a processor 1013 running software 1013, which may be configured as described above. By way of example, and not by way of limitation, object segmentation may be accomplished using a motion model to describe how the image of a target might change in accordance to different possible movements of the object. It is noted that embodiments of the present invention may use more than one camera, for example, some implementations may use two cameras. One camera can provide a zoomed-out image of the field of view to locate the user, and a second camera can zoom-in and focus on the user's face to provide a close-up image for better head and gaze direction estimation.

A user's eye gaze direction may also be acquired using this setup. By way of example, and not by way of limitation, infrared light may be initially directed towards the user's eyes from the infrared light sensor 1007 and the reflection captured by the camera 1005. The information extracted from the reflected infrared light will allow a processor coupled to the camera 1005 to determine an amount of eye rotation for the user. Video based eye trackers typically use the corneal reflection and the center of the pupil as features to track over time.

Thus, FIG. 10A illustrates a facial orientation characteristic tracking setup that is configured to track both the user's head tilt angle and eye gaze direction in accordance with an embodiment of the present invention. It is noted that, for the purposes of example, it has been assumed that the user is straight across from the display and camera. However, embodiments of the invention can be implemented even if the user is not straight across from the display 1003 and/or camera 1005. For example, the user 1001 can be +45° or −45° to the right/left of display. As long as the user 1001 is within field of view of the camera 205, the head angle $\theta_H$ and eye gaze $\theta_E$ can be estimated. Then, a normalized angle can be computed as a function of the location of user 1001 with respect to the display 1003 and/or camera 1005 (e.g. body angle $\theta_B$ as shown in FIG. 10A), the head angle $\theta_H$ and eye gaze $\theta_E$. By way of example and not by way of limitation, if the user 1001, is located such that the body angle $\theta_B$ is +45° and if the head is turned at an angle $\theta_H$ of −45°, the user 1001 is fixing the deviation of the body from the display 1003 by turning his head, and this is almost as good as having the person looking straight at the display. Specifically, if, e.g., the user's gaze angle $\theta_E$ is zero (i.e., the user's pupils are centered), the normalized angle (e.g., $\theta_B+\theta_H+\theta_E$) is zero.

Figure 10B:
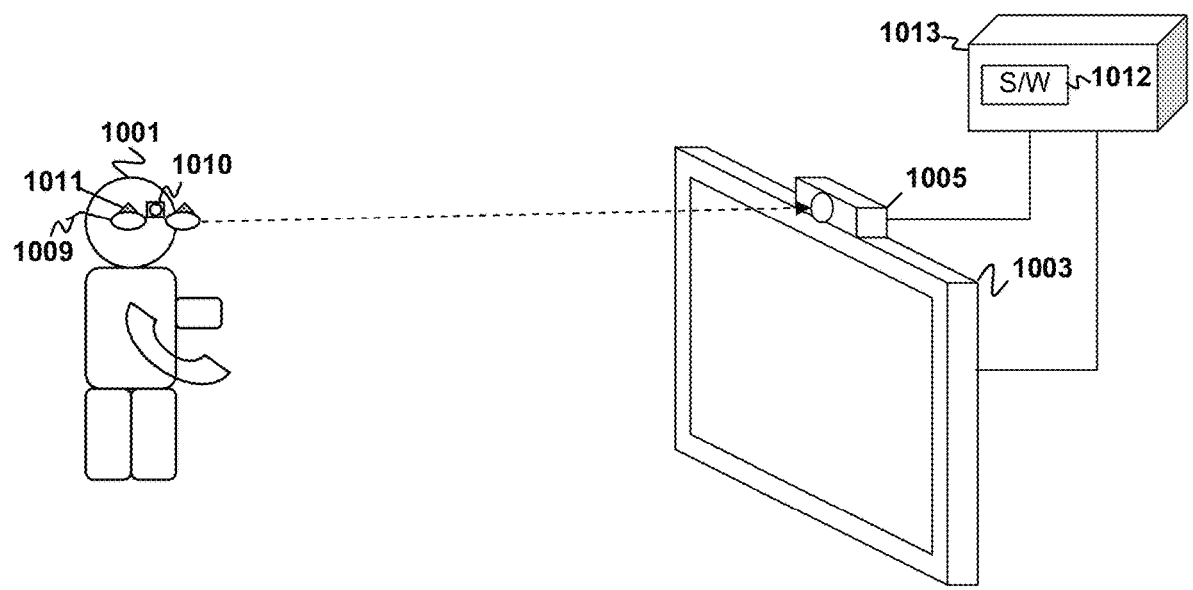

FIG. 10B provides another facial orientation characteristic tracking setup. In FIG. 10B, the user 1001 is facing a camera 1005 mounted on top of a visual display 1003. The user 1001 is simultaneously wearing a pair of glasses 1009 (e.g., a pair of 3D shutter glasses) with a pair of spaced-apart infrared (IR) light sources 1011 (e.g., one IR LED on each lens of the glasses 1009). The camera 1005 may be configured to capture the infrared light emanating from the light sources 1011, and then triangulate user's head tilt angle from the information obtained. Because the position of the light sources 1011 will not vary significantly with respect to its position on the user's face, this setup will provide a relatively accurate estimation of the user's head tilt angle.

The glasses 1009 may additionally include a camera 1010 which can provide images to the processor 1013 that can be used in conjunction with the software 1012 to find the location of the visual display 1003 or to estimate the size of the visual display 203. By way of example, and not by way of limitation, the visual display be of a known type having known vertical and horizontal screen dimensions. A test image of a known size relative to the screen may be displayed. Images of the test image may be obtained by the camera and analyzed to determine the orientation and dimensions of the test image in the images obtained by the camera 1010. Gathering this information allows the system to normalize the user's facial orientation characteristic data so that calculation of those characteristics is independent of both the absolute locations of the display 1003 and the user 1001. Moreover, the addition of the camera will allow the system to more accurately estimate visible range. Thus, FIG. 2B illustrates an alternative setup for determining a user's head tilt angle according to an aspect of the present disclosure. In some embodiments, separate cameras may be mounted to each lens of the glasses 1009 facing toward the user's eyes to facilitate gaze tracking by obtaining images of the eyes showing the relative location of the pupil with respect to the centers or corners of the eyes, e.g., as discussed above. The relatively fixed position of the glasses 1009 relative to the user's eyes facilitates tracking the user's eye gaze angle $\theta_E$ independent of tracking of the user's head orientation $\theta_H$.

Figure 10C:
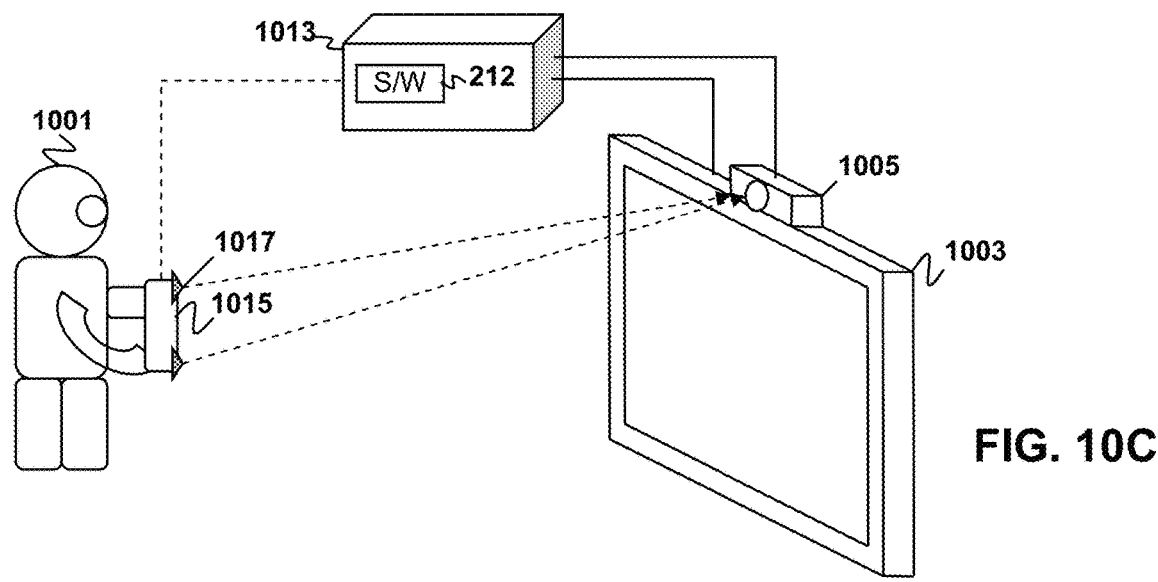

FIG. 10C provides a third facial orientation characteristic tracking setup. In FIG. 10C, the user 1001 is facing a camera 1005 mounted on top of a visual display 1003. The user is also holding a controller 1015 with one or more cameras 1017 (e.g., one on each side) configured to facilitate interaction between the user 1001 and the contents on the visual display 1003.

Images from the camera 1017 may be analyzed to determine the location of the visual display 1003 or to estimate the size of the visual display 1003, e.g., using a displayed test image as in the above example. Gathering this information allows the system to normalize the user's facial orientation characteristic data so that calculation of those characteristics is independent of both the absolute locations of the display 1003 and the user 1001. Moreover, the addition of the cameras 1017 to the controller 1015 allows the system to more accurately estimate visible range.

It is important to note that the setup in FIG. 10C may be further combined with the setup in FIG. 10A (not shown in FIG. 10C) in order to track the user's eye gaze direction in addition to tracking the user's head tilt angle while making the system independent of display size and location. Because the user's eyes are unobstructed in this setup, his eye gaze direction may be obtained through the infrared light reflection and capturing process discussed above.

Figure 10D:
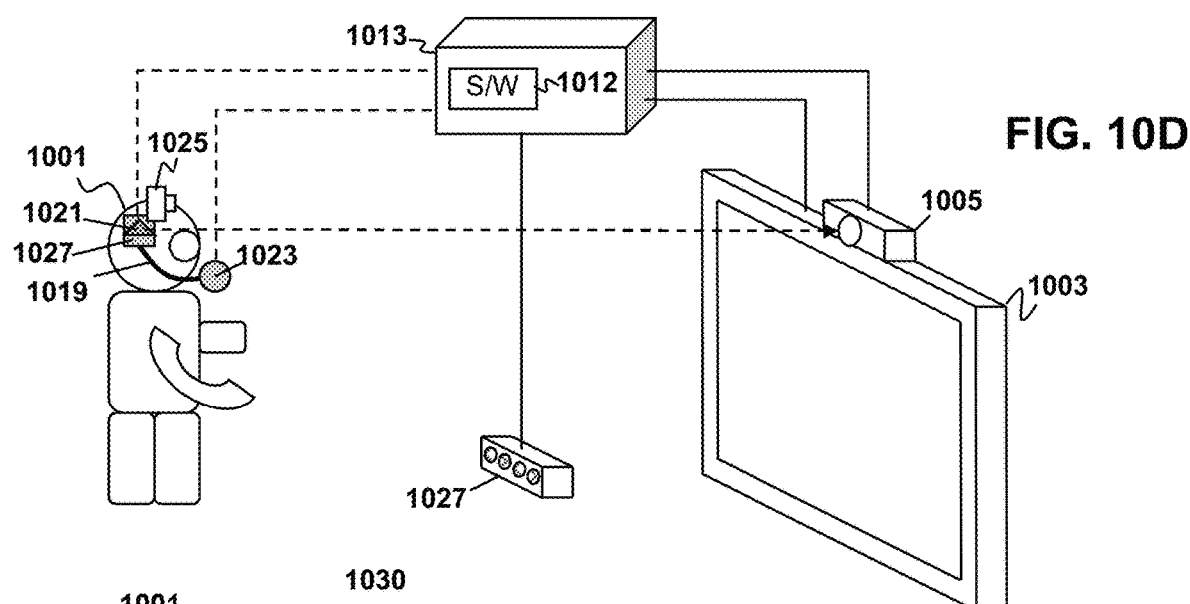

FIG. 10D provides yet another alternative facial orientation characteristic tracking setup. In FIG. 10D, the user 1001 is facing a camera 1005 mounted on top of a visual display 1003. The user 1001 is also wearing a headset 1019 with infrared light sources 1021 (e.g., one on each eyepiece) and a microphone 1023, the headset 1019 being configured to facilitate interaction between the user 1001 and the contents on the visual display 1003. Much like the setup in FIG. 10B, the camera 1005 may capture images of the infrared light emanating from the light sources 1021 on the headset 1019, and the user's head tilt angle may be triangulated from analysis the images obtained. Because the position of the headset 1019 tends not to vary significantly with respect to its position on the user's face, this setup can provide a relatively accurate estimation of the user's head tilt angle.

In addition to tracking the user's head tilt using the infrared light sensors 1021, the position of the user's head with respect to a specified target may also be tracked by a separate microphone array 1027 that is not part of the headset 1019. The microphone array 1027 may be configured to facilitate determination of a magnitude and orientation of the user's speech, e.g., using suitably configured software 1012 running on the processor 1013. Examples of such methods are described e.g., in commonly assigned U.S. Pat. No. 7,783,061, commonly assigned U.S. Pat. No. 7,809,145, and commonly-assigned U.S. Patent Application Publication number 2006/0239471, the entire contents of all three of which are incorporated herein by reference.

A detailed explanation of directional tracking of a user's speech using thermographic information may be found in U.S. patent application Ser. No. 12/889,347, to Ruxin Chen and Steven Osman filed Sep. 23, 2010 entitled "BLOW TRACKING USER INTERFACE SYSTEM AND METHOD", which is herein incorporated by reference. By way of example, and not by way of limitation, the orientation of the user's speech can be determined using a thermal imaging camera to detect vibration patterns in the air around the user's mouth that correspond to the sounds of the user's voice during speech. A time evolution of the vibration patterns can be analyzed to determine a vector corresponding to a generalized direction of the user's speech.

Using both the position of the microphone array 1027 with respect to the camera 1005 and the direction of the user's speech with respect to the microphone array 1027, the position of the user's head with respect to a specified target (e.g., display) may be calculated. To achieve greater accuracy in establishing a user's head tilt angle, the infrared reflection and directional tracking methods for determining head tilt angle may be combined. Alternative embodiments may additionally include an inertial sensor 1027, as described with respect to FIG. 1A above.

The headset 1019 may additionally include a camera 1025 configured to obtain images of the visual display 1003 that may be analyzed to find the location of the display and/or to estimate the size of the visual display 1003. Gathering this information allows the system to normalize the user's facial orientation characteristic data so that calculation of those characteristics is independent of both the absolute locations of the display 1003 and the user 1001. Moreover, the addition of the camera will allow the system to more accurately estimate visible range. In some embodiments, one or more cameras 1025 may be mounted to the headset 1019 facing toward the user's eyes to facilitate gaze tracking by obtaining images of the eyes showing the relative location of the pupil with respect to the centers or corners of the eyes, e.g., as discussed above. The relatively fixed position of the headset 1019 (and therefore, the camera(s) 1025) relative to the user's eyes facilitates tracking the user's eye gaze angle $\theta_E$ independent of tracking of the user's head orientation $\theta_H$.

It is important to note that the setup in FIG. 10D may be combined with the setup in FIG. 10A (not shown in FIG. 10D) in order to track the user's eye gaze direction in addition to tracking the user's head tilt angle. Because the user's eyes are unobstructed in this setup, his eye gaze direction may be obtained through infrared light reflection and capturing process discussed above.

Figure 10E:
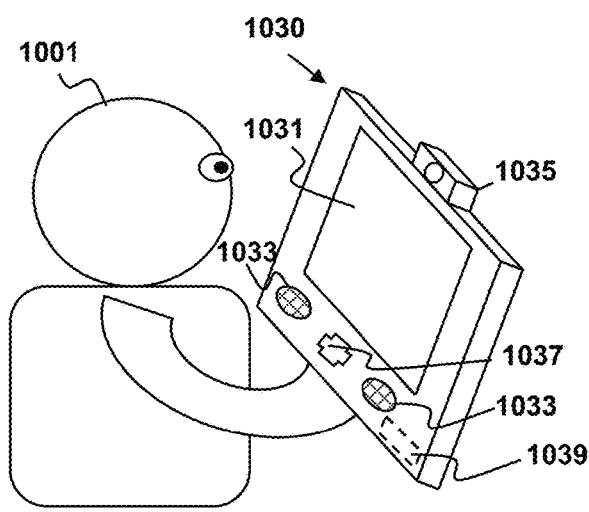
FIG. 10E is a schematic diagram illustrating a portable device that can utilize facial orientation tracking according to an aspect of the present disclosure.

Embodiments of the present invention can also be implemented in hand-held devices, such as cell phones, tablet computers, personal digital assistants, portable internet devices, or portable game devices, among other examples. FIG. 10E illustrates one possible example of determining eye gaze direction in the context of a hand-held device 1030. The device 1030 generally includes a processor 1039 which can be programmed with suitable software, e.g., as described above. The device 1030 may include a display screen 1031 and camera 1035 coupled to the processor 1039. One or more microphones 1033 and control switches 1037 may also be optionally coupled the processor 1039. The microphone 1033 may be part of a microphone array. The control switches 1037 can be of any type normally used with the particular type of hand-held device. For example, if the device 1030 is a cell phone, the control switches 237 may include a numeric keypad or alpha-numeric keypad, touch screen, or touch pad, as commonly used in such devices. Alternatively, if the device 1030 is a portable game unit, the control switches 1037 may include digital or analog joysticks, digital control switches, triggers, and the like. In some embodiments, the display screen 1031 may be a touch screen interface and the functions of the control switches 1037 may be implemented by the touch screen in conjunction with suitable software, hardware or firmware. The camera 1035 may be configured to face the user 1001 when the user looks at the display screen 1031. The processor 1039 may be programmed with software to implement head pose tracking and/or eye-gaze tracking. The processor may be further configured to utilize head pose tracking and/or eye-gaze tracking information, e.g., as discussed above.

It is noted that the display screen 1031, microphone(s) 1033, camera 1035, control switches 1037 and processor 1039 may be mounted to a case that can be easily held in a user's hand or hands. In some embodiments, the device 1030 may operate in conjunction with a pair of specialized glasses, which may have features in common with the glasses 1009 shown in FIG. 10B and described hereinabove. Such glasses may communicate with the processor through a wireless or wired connection, e.g., a personal area network connection, such as a Bluetooth network connection. In some embodiments, the device 1030 may be used in conjunction with a headset, which can have features in common with the headset 1019 shown in FIG. 10D and described hereinabove. Such a headset may communicate with the processor through a wireless or wired connection, e.g., a personal area network connection, such as a Bluetooth network connection. The device 1030 may include suitable antenna and transceiver to facilitate wireless network connection.

It is noted that the examples depicted in FIGS. 10A-10E are only a few examples of many setups that could be used to track a user's facial orientation characteristics in accordance with aspects of the present disclosure. Similarly, various body and other facial orientation characteristics in addition to the head tilt angle and eye gaze direction described above may be tracked to facilitate the adjustment of regions of interest rendered on a display.

Additional Aspects

Aspects of the present disclosure also include a non-transitory computer-readable medium having computer executable instructions embodied therein that, when executed, implement video processing in accordance with the above-mentioned aspects, e.g., as described above with respect to FIG. 1A, FIG. 3, FIG. 4, FIGS. 5A-5B, FIGS. 6A-6C, and FIG. 8. Examples of suitable computer-readable media include, but are not limited to RAM, ROM, hard disk, flash drive, SDRAM, CD-ROM, Blu-Ray, magnetic tape, and floppy disk.

Conclusion

It is noted that aspects of the present disclosure have been described with reference to eye tracking devices that use infrared light sources. However, it is understood that other implementations are possible. For example, in implementations of the present disclosure, other invisible light sources are possible, such as ultraviolet light. By way of further example, in implementations of the present disclosure, visible light sources are possible for eye illumination, although it may be desirable to use invisible light sources in order to avoid distracting a user.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method comprising:
   a) obtaining gaze tracking information representing one or more regions of interest of a video frame;
   b) compressing one or more sections of the video frame corresponding to the one or more regions of interest with a low compression encoder to generate low-compression section data, wherein the low compression encoder, encodes the one or more sections of the video frame corresponding to the one or more regions of interest as intra frames and in a way that does not require motion search or prediction mode decision to reduce latency and frame-level delay;
   c) downscaling the video frame and compressing a resulting downscaled video frame with a high compression encoder to generate high-compression frame data, wherein the compressing with the high compression encoder includes prediction mode decision;
   d) transmitting the high compression frame data and the low compression section data over a network.

2. The method of claim 1 wherein b) further comprises applying a mask to an edge of the one or more sections of the corresponding to the one or more regions of interest to generate a gradient of resolution degradation.

3. The method of claim 2 wherein applying the mask generates a linear gradient of resolution degradation.

4. The method of claim 2 wherein applying the mask generates a non-linear gradient of resolution degradation.

5. The method of claim 1 wherein compressing one or more subsections of the video frame corresponding to the one or more regions of interest includes adjusting a size of the one or more regions of interest in response to motion sickness related information.

6. The method of claim 5 wherein the motion sickness related response is a visual movement threshold.

7. The method of claim 5 wherein the motion sickness related response is detected by one or more sensors.

8. The method of claim 1 wherein transmitting the high compression frame data and the low compression section data over a network further comprises transmitting a location within the video stream of the one or more low compression subsections.

9. The method of claim 8 wherein the location within the video stream of the one or more low compression subsections is, placed in the frame header of the low compression subsections.

10. A system, comprising:
    a processor;
    a memory coupled to the processor containing processor executable instructions, that when executed cause the processor to implement a method, the method comprising:
    a) obtaining gaze tracking information representing one or more regions of interest of a video frame;
    b) compressing one or more sections of the video frame corresponding to the one or more regions of interest with a low compression encoder to generate low-compression section data, wherein the low compression encoder, encodes the one or more sections of the video frame corresponding to the one or more regions of interest as intra frames and in a way that does not require motion search or prediction mode decision to reduce latency and frame-level delay;
    c) downscaling the video frame and compressing a resulting downscaled video frame with a high compression encoder to generate high-compression frame data, wherein the compressing with the high compression encoder includes prediction mode decision;
    d) transmitting the high compression frame data and the low compression section data over a network.

11. The system of claim 10 wherein b) further comprises applying a mask to an edge of the one or more sections of the corresponding to the one or more regions of interest to generate a gradient of resolution degradation.

12. The system of claim 11 wherein applying the mask generates a linear gradient of resolution degradation.

13. The system of claim 11 wherein applying the mask generates a non-linear gradient of resolution degradation.

14. The system of claim 10 wherein compressing one or more subsections of the video frame corresponding to the one or more regions of interest includes adjusting a size of the one or more regions of interest in response to motion sickness related information.

15. The system of claim 14 wherein the motion sickness related response is a visual movement threshold.

16. The system of claim 14 wherein the motion sickness related response is detected by one or more sensors.

17. The system of claim 10 wherein transmitting the high compression frame data and the low compression section data over a network further comprises transmitting a location within the video stream of the one or more low compression subsections.

18. The method of claim 17 wherein the location within the video stream of the one or more low compression subsections is placed in the frame header of the low compression subsections.

19. A non-transitory computer-readable medium having computer executable instructions; that when executed cause a computer to implement a method, the method comprising:
  a) obtaining gaze tracking information representing one or more regions of interest of a video frame;
  b) compressing one or more sections of the video frame corresponding to the one or more regions of interest with a low compression encoder to generate low-compression section data, wherein the low compression encoder, encodes the one or more sections of the video frame corresponding to the one or more regions of interest as intra frames and in a way that does not require motion search or prediction mode decision to reduce latency and frame-level delay;
  c) downscaling the video frame and compressing a resulting downscaled video frame with a high compression encoder to generate high-compression frame data, wherein the compressing with the high compression encoder includes prediction mode decision;
  d) transmitting the high compression frame data and the low compression section data over a network.

20. A method comprising:
  a) decompressing high-compression frame data corresponding to a downscaled video frame to generate downscaled video frame data, wherein the high-compression frame data includes prediction frames;
  b) upscaling the downscaled video frame data to generate up-scaled video frame data;
  c) decompressing low-compression data for one or more sections of the video frame that correspond to one or more regions of interest to generate region of interest data, wherein the one or more sections of the video frame are encoded as Intra frames and in a way that does not require motion search or prediction mode decision;
  d) combining the up-scaled video frame data with the region of interest data to generate a combined frame;
  e) displaying the combined frame on a display.

21. The method of 20 wherein d) includes determining a location to place the one or more sections of the video frame that correspond to the one or more regions of interest in the combined frame.

22. The method of 20 wherein e) includes using gaze tracking information to determine a location to place the one or more sections of the video frame that correspond to the one or more regions of interest in the combined frame.

23. The method of claim 20 wherein e includes applying a mask to the one or more sections of the video frame that correspond to the one or more regions of interest to generate a resolution degradation gradient between portions of the combined frame corresponding to the up-scaled video frame and the one or more sections of the video frame that correspond to the one or more regions of interest at an edge of the one or more regions of interest.

24. The method of claim 23, further comprising applying a second mask to the up-scaled video frame data to dim the up-scaled video frame.

25. The method of claim 23 wherein the mask generates a linear degradation gradient.

26. The method of 23 wherein the mask generates a non-linear degradation gradient.

27. The method of claim 20, further comprising adjusting a size of the one or more regions of interest based on a motion sickness related response.

28. The method of claim 27 wherein the motion sickness related response is a galvanic skin response.

29. The method of claim 28 wherein the motion sickness related response is a user determined threshold for a motion vector within the video frame.

30. A system, comprising:
  a processor;
  a memory coupled to the processor containing processor executable instructions, that when executed cause the processor to implement a method, the method comprising:
  a) decompressing high-compression frame data corresponding to a downscaled video frame to generate downscaled video frame data, wherein the high-compression frame data includes prediction frames;
  b) upscaling the downscaled video frame data to generate up-scaled video frame data;
  c) decompressing low-compression data for one or more sections of the video frame that correspond to one or more regions of interest to generate region of interest data, wherein the one or more sections of the video frame are encoded as intra frames and in a way that does not require motion search or prediction mode decision;
  d) combining the up-scaled video frame data with the region of interest data to generate a combined frame;
  e) displaying the combined frame on a display.

31. The system of claim 30 wherein d) includes determining a location to place the one or more sections of the video frame that correspond to the one or more regions of interest in the combined frame.

32. The system of claim 30 wherein e) includes using gaze tracking information to determine a location to place the one or more sections of the video frame that correspond to the one or more regions of interest in the combined frame.

33. The system of claim 30 wherein e includes applying a mask to the one or more sections of the video frame that correspond to the one or more regions of interest to generate a resolution degradation gradient between portions of the combined frame corresponding to the up-scaled video frame and the one or more sections of the video frame that correspond to the one or more regions of interest at an edge of the one or more regions of interest.

34. The system of claim 33, further comprising applying a second mask to the up scaled video frame data to dim the up-scaled video frame.

35. The system of claim 33 wherein the mask generates a linear degradation gradient.

36. The system of claim 33 wherein the mask generates a non-linear degradation gradient.

37. The system of claim 30, further comprising adjusting a size of the one or more regions of interest based on a motion sickness related response.

38. The system of claim 37 wherein the motion sickness related response is a galvanic skin response.

39. The system of claim 38 wherein the motion sickness related response is a user determined threshold for a motion vector within the video frame.

40. A non-transitory computer-readable medium having computer executable instructions, that when executed cause a computer to implement a method, the method comprising:
  a) decompressing high-compression frame data corresponding to a downscaled video frame to generate downscaled video frame data, wherein the high-compression frame data includes prediction frames;
  b) upscaling the downscaled video frame data to generate up-scaled video frame data;
  c) decompressing low-compression data for one or more sections of the video frame that correspond to one or more regions of interest to generate region of interest data, wherein the one or more sections of the video frame are encoded as intra frames and in a way that does not require motion search or prediction mode decision;
  d) combining the up-scaled video frame data with the region of interest data to generate a combined frame;
  e) displaying the combined frame on a display.

* * * * *